US012535767B2

(12) United States Patent
Zhu

(10) Patent No.: US 12,535,767 B2
(45) Date of Patent: Jan. 27, 2026

(54) PROCESS CARTRIDGE INSTALLABLE INTO MAIN ASSEMBLY OF IMAGING APPARATUS

(71) Applicant: ZHUHAI YANQI TECHNOLOGY CO., LTD., Zhuhai (CN)

(72) Inventor: Yu Zhu, Zhangjiajie (CN)

(73) Assignee: ZHUHAI YANQI TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/192,719

(22) Filed: Apr. 29, 2025

(65) Prior Publication Data

US 2025/0258459 A1 Aug. 14, 2025

Related U.S. Application Data

(63) Continuation-in-part of application No. PCT/CN2023/127958, filed on Oct. 30, 2023.

(30) Foreign Application Priority Data

Oct. 30, 2022 (CN) ......................... 202222871761.7
Oct. 31, 2022 (CN) ......................... 202222886283.7
(Continued)

(51) Int. Cl.
*G03G 15/00* (2006.01)
*G03G 21/18* (2006.01)

(52) U.S. Cl.
CPC ..... *G03G 21/1867* (2013.01); *G03G 21/1814* (2013.01); *G03G 21/1832* (2013.01)

(58) Field of Classification Search
CPC ........... G03G 21/1814; G03G 21/1832; G03G 21/1867
See application file for complete search history.

(56) References Cited

U.S. PATENT DOCUMENTS 10,126,704 B2 * 11/2018 Shimizu ............. G03G 15/0896
2007/0019980 A1 * 1/2007 Kim ..................... G03G 15/065 399/223
(Continued)

FOREIGN PATENT DOCUMENTS

CN 1900838 A 1/2007
CN 204044502 U 12/2014
(Continued)

OTHER PUBLICATIONS

International Search Report and Written Opinion issued in corresponding PCT Application No. PCT/CN2023/127958, dated Dec. 11, 2023.

*Primary Examiner* — Hoang X Ngo
(74) *Attorney, Agent, or Firm* — Westbridge IP LLC

(57) ABSTRACT

A process cartridge includes a developing unit frame, a developing roller rotatably supported by the developing unit frame, a power supply member capable of being electrically connected to the developing roller, and a grounding member capable of switching between a state of being electrically connected to the developing roller and a state of not being electrically connected to the developing roller. With a process cartridge having such a structure, during cleaning operations, separation of the developing roller and a photosensitive drum is unnecessary, and the technical problem of print defects caused by toner transfer from the developing roller onto the photosensitive drum during cleaning operations is simultaneously solved.

20 Claims, 21 Drawing Sheets

(30) Foreign Application Priority Data

| | | |
|---|---|---|
| Nov. 5, 2022 | (CN) | 202222942583.2 |
| Nov. 6, 2022 | (CN) | 202222943491.6 |

(56) References Cited

U.S. PATENT DOCUMENTS

| | | | |
|---|---|---|---|
| 2021/0397122 A1 | 12/2021 | Fukui et al. |
| 2022/0082995 A1 | 3/2022 | Fukasawa |
| 2023/0176496 A1 | 6/2023 | Fujino et al. |
| 2023/0205129 A1 | 6/2023 | Suetsugu et al. |
| 2024/0036513 A1 | 2/2024 | Fukui et al. |
| 2024/0411265 A1 | 12/2024 | Fukui et al. |
| 2024/0419124 A1 | 12/2024 | Ishii et al. |
| 2025/0013192 A1 | 1/2025 | Koishi et al. |

FOREIGN PATENT DOCUMENTS

| | | | |
|---|---|---|---|
| CN | 110609459 | A | 12/2019 |
| CN | 213876326 | U | 8/2021 |
| CN | 113574468 | A | 10/2021 |
| DE | 2535366 | A1 | 2/1976 |
| EP | 1748323 | A1 | 1/2007 |
| EP | 3944025 | A1 | 1/2022 |
| EP | 3971654 | A1 | 3/2022 |
| JP | 2020154312 | A | 9/2020 |
| JP | 2022049295 | A | 3/2022 |
| JP | 2022050270 | A | 3/2022 |
| KR | 1020070010657 | A | 1/2007 |
| KR | 1020210133277 | A | 11/2021 |
| KR | 1020220036858 | A | 3/2022 |

* cited by examiner

PROCESS CARTRIDGE INSTALLABLE INTO MAIN ASSEMBLY OF IMAGING APPARATUS

CROSS-REFERENCE TO RELATED APPLICATIONS

This application is a continuation-in-part of International Application No. PCT/CN2023/127958, filed on Oct. 30, 2023, which claims priority to Chinese Patent Application No. 202222871761.7, filed on Oct. 30, 2022; Chinese Patent Application No. 202222886283.7, filed on Oct. 31, 2022; Chinese Patent Application No. 202222942583.2, filed on Nov. 5, 2022; and Chinese Patent Application No. 202222943491.6, filed on Nov. 6, 2022. All of the aforementioned applications are incorporated herein by reference in their entireties.

TECHNICAL FIELD

The present application relates to the field of electrophotographic imaging technology, and more particularly, to a process cartridge.

BACKGROUND

Imaging apparatuses that employ electrophotographic imaging, such as laser printers, photocopiers, and facsimile machines, typically include at least one electrode assembly and a developer transfer assembly. The electrode assembly commonly comprises at least one charging electrode, a developing electrode, and at least one grounding terminal; some apparatuses may also include a supply electrode. The transfer assembly includes a developer transfer member such as transfer roller, transfer belt, or the like. These apparatuses also incorporate a process cartridge, which can be removably detached from the imaging apparatus. Existing process cartridges primarily include: integrated process cartridges, wherein a photosensitive drum unit and a developing unit are integrated together, and separate process cartridges, which include only the photosensitive drum unit or the developing unit.

In an integrated process cartridge, the photosensitive drum unit and the developing unit are typically connected to each other in a manner allowing for pivotable movement. The photosensitive drum unit includes components such as a photosensitive unit frame, a photosensitive drum rotatably supported by the photosensitive unit frame, and a charging roller. The developing unit includes components such as a developing unit frame, a developing roller rotatably supported by the developing unit frame, and a toner hopper. During the imaging operation of the process cartridge, the photosensitive drum and the developing roller are in mutual contact. In developing methods employed by imaging apparatuses where the developing roller is positioned in contact with the photosensitive drum to develop a latent image on the photosensitive drum, the developing roller is kept pressed against the outer peripheral surface of the photosensitive drum. During non-imaging operation periods of the process cartridge, cleaning operations are required for components such as the photosensitive drum, transfer roller, or transfer belt.

Some existing designs incorporate a force receiving mechanism on the process cartridge. During imaging operation, the developing roller and photosensitive drum are in contact. During cleaning, the force receiving mechanism receives an actuating force from the imaging apparatus, thereby causing the developing roller and the photosensitive drum to separate. However, this type of force receiving mechanism tends to be relatively complex.

There is an existing type of process cartridge that is removably installable into an imaging apparatus. This process cartridge includes a developing unit and a photosensitive unit. The photosensitive unit includes a photosensitive unit frame and a photosensitive drum. The developing unit includes a developing unit frame and a developing roller. A first force receiving assembly is located at a first end of the process cartridge in its length direction and is adapted to receive force from a first actuating part. A cartridge-side developing electrode is located at a second end of the process cartridge in its length direction. The process cartridge further includes a switching device located at the aforementioned first end of the process cartridge. The switching device comprises a second force receiving assembly, a first electrical connection member, and a second electrical connection member. The second force receiving assembly includes a second force receiving member and a first elastic member. The first electrical connection member is connected to the second force receiving member and the developing roller. The second electrical connection member is connected to the cartridge-side developing electrode. The second force receiving member is movable relative to the developing unit frame between a first position and a second position, and also between the second position and a third position. When the process cartridge is installed in the imaging apparatus, during imaging operation, the second force receiving member is located at the second position, and the first electrical connection member is in electrical contact with the second electrical connection member. During non-imaging operation, the second force receiving member is located at the third position, and the first electrical connection member is not in contact with the second electrical connection member.

In a process cartridge with such a structure, during imaging operation, the developing roller and the photosensitive drum are in mutual contact, and the developing roller is electrified (the developing electrode of the imaging apparatus is electrically connected to the cartridge-side developing electrode of the process cartridge and maintains power supply to the developing roller). The photosensitive drum includes a conductive substrate layer (e.g., an aluminum conductive layer) and a photosensitive layer covering the surface of the substrate layer. The charging roller charges the photosensitive layer, causing the voltage of the photosensitive layer to become lower than the voltage of the developing roller. When the photosensitive layer is exposed by laser light emitted from the apparatus, the photosensitive layer in the exposed area becomes conductive with the substrate layer. The charge on the photosensitive layer is released through the photosensitive drum being grounded (substrate layer being grounded), causing the voltage of the exposed area to become higher than the voltage of the developing roller. An electrostatic latent image is formed on the surface of the photosensitive drum, and the negatively charged toner can transfer from the developing roller to the exposed area of the photosensitive drum. During non-imaging operation periods, the developing roller and the photosensitive drum do not need to be separated; they remain in a state of contact, but the power supply to the developing roller is disconnected. During such non-imaging periods (e.g., during cleaning operations), because the developing roller and the photosensitive drum are in mutual contact, the developing roller can receive electrical charge from the photosensitive drum. The direction of the electric field between the developing roller and the photosensitive drum does not change, and the potential difference between them is small (or no potential difference exists). Under these circumstances, toner present on the developing roller may be influenced by shear forces from the photosensitive drum surface or by instantaneous electric field forces, causing it to transfer to the surface of the photosensitive drum. This makes it impossible to completely clean the toner from the photosensitive drum surface, which consequently leads to further contamination of the transfer belt, transfer roller, and photosensitive drum, resulting in print defects.

SUMMARY

The present application provides a process cartridge adopting the following solution, which addresses the technical problem of print defects caused by toner transfer from the developing roller to the photosensitive drum when the photosensitive drum and developing roller are not separated during non-imaging operation periods.

A process cartridge comprising: a developing unit frame; a developing roller rotatably supported by the developing unit frame; a power supply member capable of being electrically connected to the developing roller; and a grounding member capable of switching between a state of being electrically connected to the developing roller and a state of not being electrically connected to the developing roller.

In some embodiments, the power supply member is capable of supplying power to the developing roller.

In some embodiments, when the developing roller is not electrically connected to the grounding member, the developing roller has a first voltage value; when the developing roller is electrically connected to the grounding member, the developing roller has a second voltage value; wherein the absolute value of the first voltage value is greater than the absolute value of the second voltage value.

In some embodiments, the process cartridge further comprises a connector, the connector being capable of being electrically connected to the developing roller and the power supply member, wherein the connector is capable of switching between a state of being electrically connected to the grounding member and a state of not being electrically connected to the grounding member.

In some embodiments, the connector is capable of switching between an electrically connected state and a non-electrically connected state with the power supply member.

In some embodiments, at least a portion of the connector is movable between a first position where it is electrically connected to the power supply member and a second position where it is electrically connected to the grounding member.

In some embodiments, when the at least a portion of the connector is at the first position, the connector is electrically connected to the power supply member; when the at least a portion of the connector is at the second position, the connector is electrically connected simultaneously to the power supply member and the grounding member.

In some embodiments, the process cartridge further comprises a force receiving end, the force receiving end being capable of causing the at least a portion of the connector to move between the first position and the second position.

In some embodiments, the process cartridge further comprises a force receiving end, the force receiving end being movable between a protruding position and a retracted position, wherein in the retracted position, the force receiving end is closer to the developing unit frame compared to when in the protruding position.

In some embodiments, at least a portion of the grounding member and/or at least a portion of the power supply member is movable between a position where it is electrically connected to the connector and a position where it is not electrically connected to the connector.

In some embodiments, the developing roller comprises a developing roller shaft and a first main body portion supported on the developing roller shaft; the process cartridge further comprises a connector having a first connection end and a second connection end, the first connection end being electrically connected to the developing roller shaft, wherein the second connection end is movable between a first position contacting the power supply member and a second position contacting the grounding member.

In some embodiments, the process cartridge further comprises a photosensitive unit frame connected to the developing unit frame, and a first cover member and a second cover member respectively disposed at two ends of the photosensitive unit frame in a length direction thereof; the grounding member comprises a first grounding piece and a second grounding piece, wherein one end of the first grounding piece passes through a hole in the second cover member and is inserted into a photosensitive drum, one end of the second grounding piece is electrically connected to the first grounding piece, and another end of the second grounding piece is configured to electrically connect to or disconnect from the connector.

In some embodiments, the connector comprises a first connector piece and a second connector piece, the first connector piece being installed at one end of the developing unit frame, the first connector piece being electrically connected to the developing roller, the second connector piece being electrically connected to the first connector piece, wherein the second connector piece is movable between a first position and a second position; when the second connector piece is at the first position, the second connector piece is electrically connected to the power supply member; when the second connector piece is at the second position, the second connector piece connects to the grounding member.

In some embodiments, the first connector piece is configured to rotatably support the developing roller shaft of the developing roller and form an electrical connection therewith.

In some embodiments, the second connector piece comprises a conductive portion and a non-conductive portion, the conductive portion being configured for electrical connection to the developing roller and for electrical connection to the power supply member or the grounding member, wherein the non-conductive portion is provided with a force receiving end.

In some embodiments, the connector comprises a conductive portion and a non-conductive portion, the conductive portion being configured for conduction, and the non-conductive portion being configured to support the conductive portion or mount the conductive portion.

In some embodiments, the grounding member is configured for grounding.

In some embodiments, the process cartridge further comprises a holding mechanism, wherein at least a portion of the connector is movable between a first position where it is electrically connected to the power supply member and a second position where it is electrically connected to the grounding member; when the at least a portion of the connector moves to the first position, the holding mechanism is capable of causing the connector to maintain electrical connection with the power supply member; when the at least a portion of the connector moves to the second position, the holding mechanism is capable of causing the connector to maintain electrical connection with the grounding member.

Based on the inventive concept of the present application, the present application also provides a process cartridge, comprising: a developing unit frame; a developing roller rotatably supported by the developing unit frame; a power supply member capable of being electrically connected to the developing roller; and a grounding member capable of being electrically connected to the developing roller, wherein at least a portion of the grounding member is configured to be movable to cause the developing roller to be grounded or not grounded.

In some embodiments, the process cartridge further comprises a connector, the connector being capable of being electrically connected to the developing roller and the power supply member, wherein at least a portion of the grounding member and at least a portion of the power supply member are configured to be movable relative to the connector.

In some embodiments, the power supply member is capable of supplying power to the developing roller, wherein the developing roller has a first voltage value when the developing roller is not electrically connected to the grounding member; when the developing roller is electrically connected to the grounding member, the developing roller has a second voltage value; wherein the absolute value of the first voltage value is greater than the absolute value of the second voltage value.

BRIEF DESCRIPTION OF THE DRAWINGS

Other features, objectives and advantages of the present application will become more apparent by reading the detailed description of non-limiting embodiments made with reference to the following accompanying drawings. In the drawings.

DETAILED DESCRIPTION OF THE EMBODIMENTS

Figure 1:
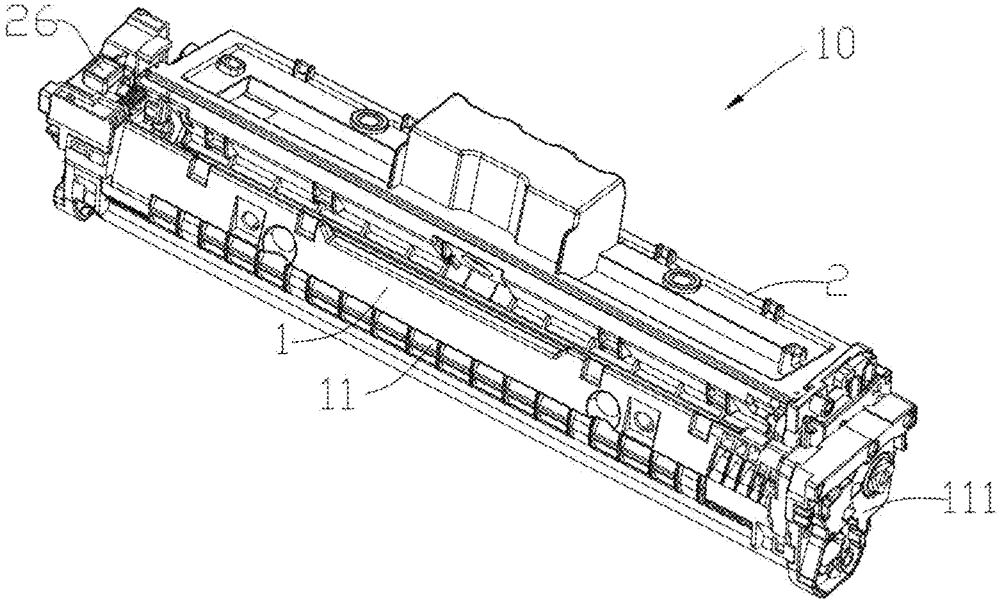
FIG. 1 is a schematic overall structural view of a process cartridge according to Embodiment 1.
Figure 2:
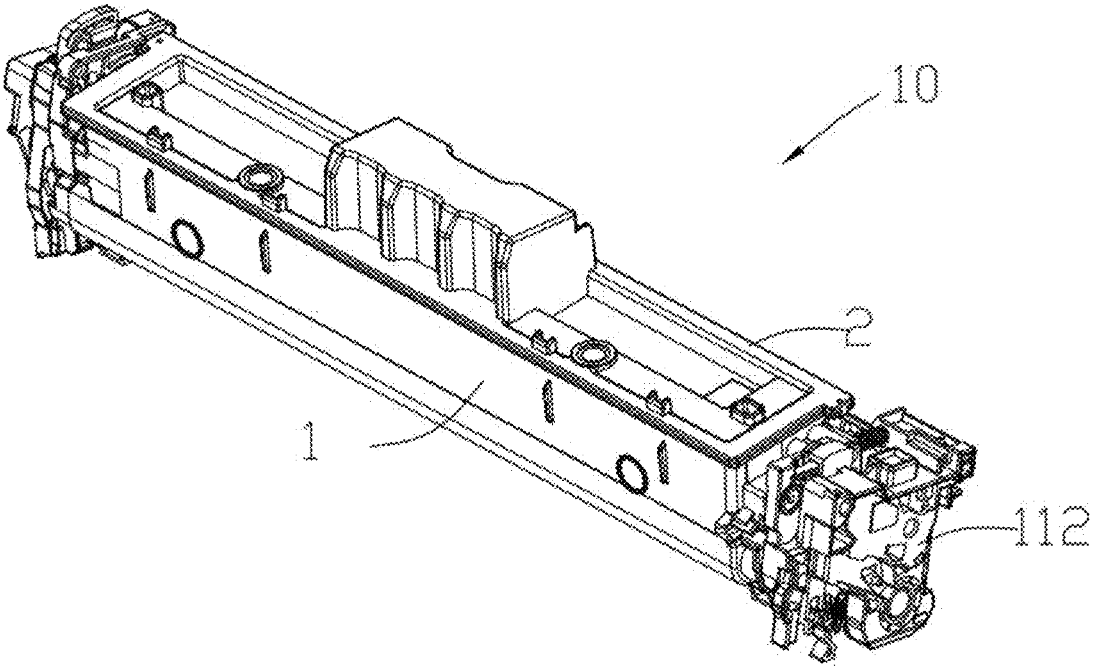
FIG. 2 is another perspective schematic overall structural view of the process cartridge of Embodiment 1.
Figure 3:
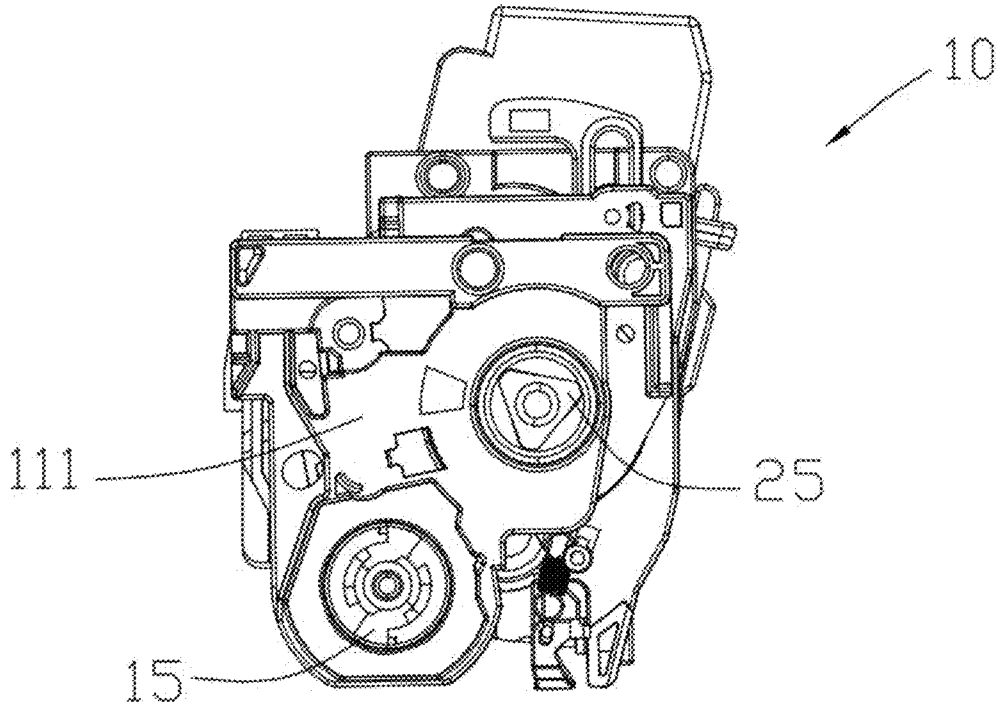
FIG. 3 is a schematic structural view of the driving end of the process cartridge of Embodiment 1.
Figure 4:
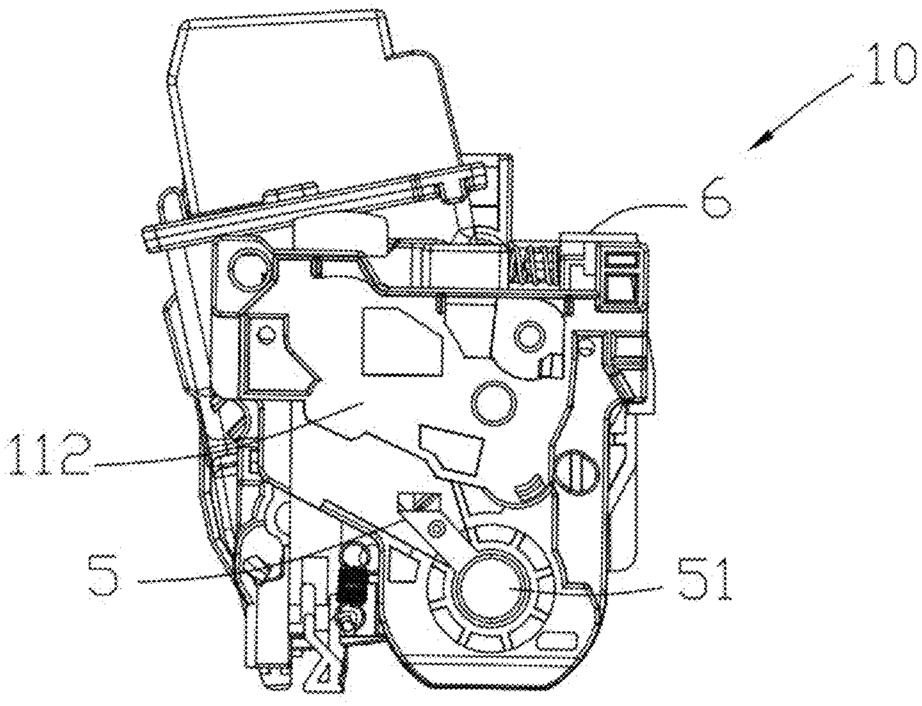
FIG. 4 is a schematic structural view of the electrical contact end of the process cartridge of Embodiment 1.
Figure 5:
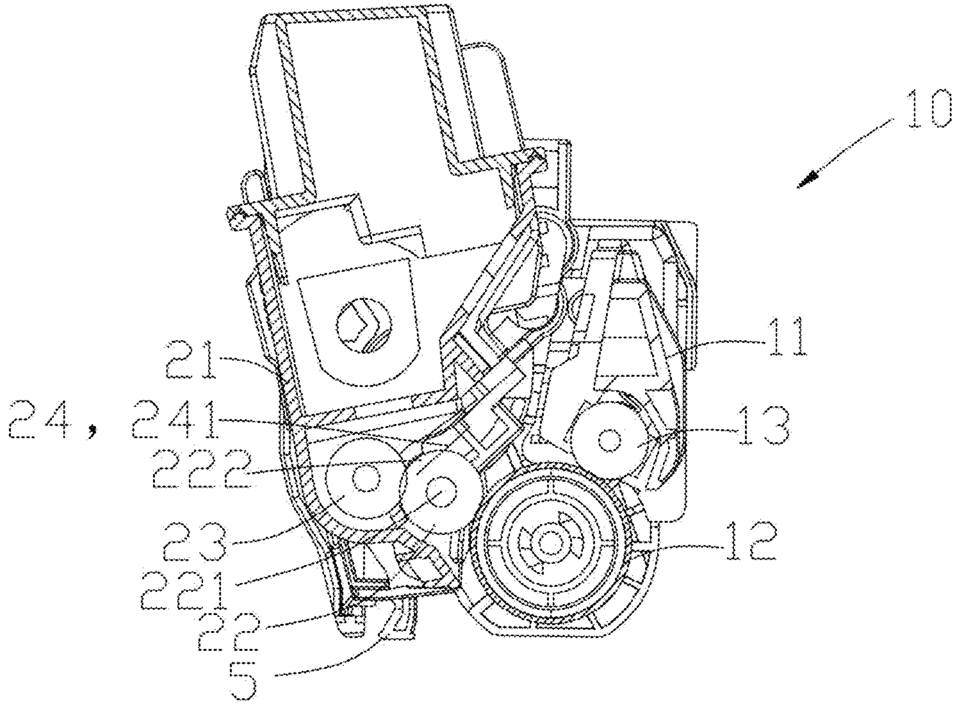
FIG. 5 is a cross-sectional view of the process cartridge of Embodiment 1.
Figure 6:
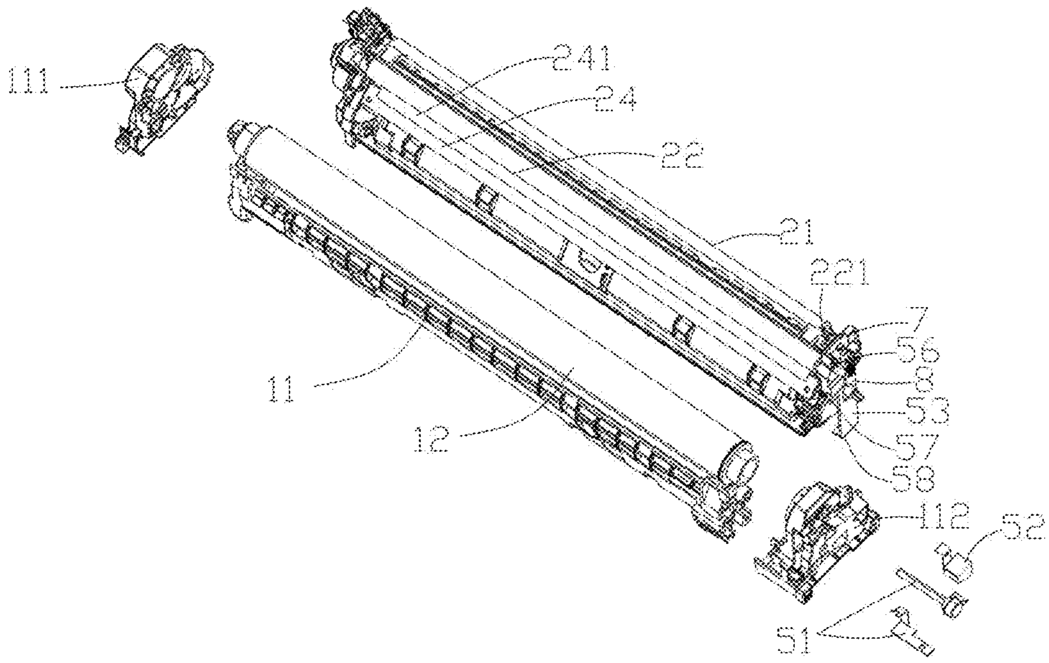
FIG. 6 is a partial exploded structural view of the process cartridge of Embodiment 1.
Figure 7:
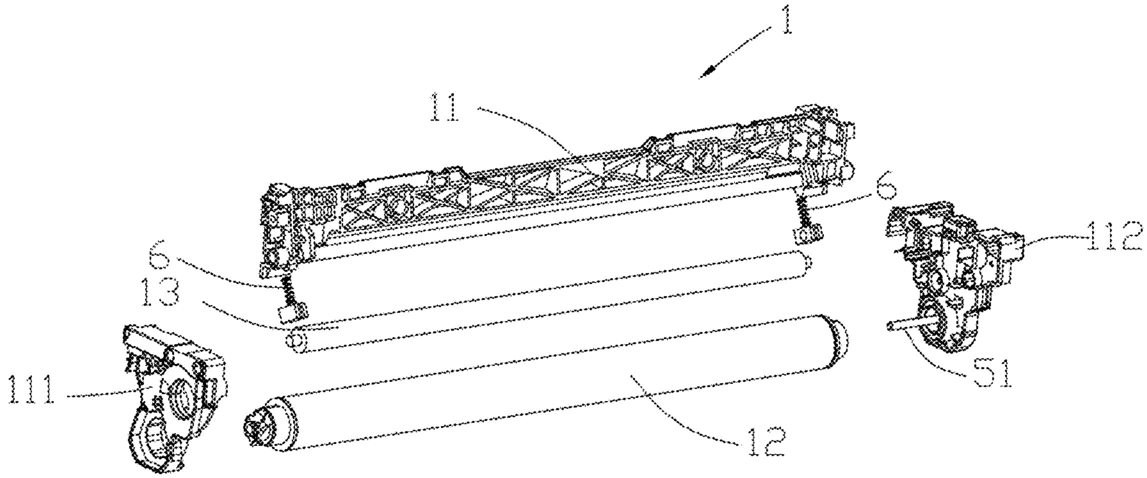
FIG. 7 is a partial exploded structural view of the photosensitive unit of Embodiment 1.
Figure 8:
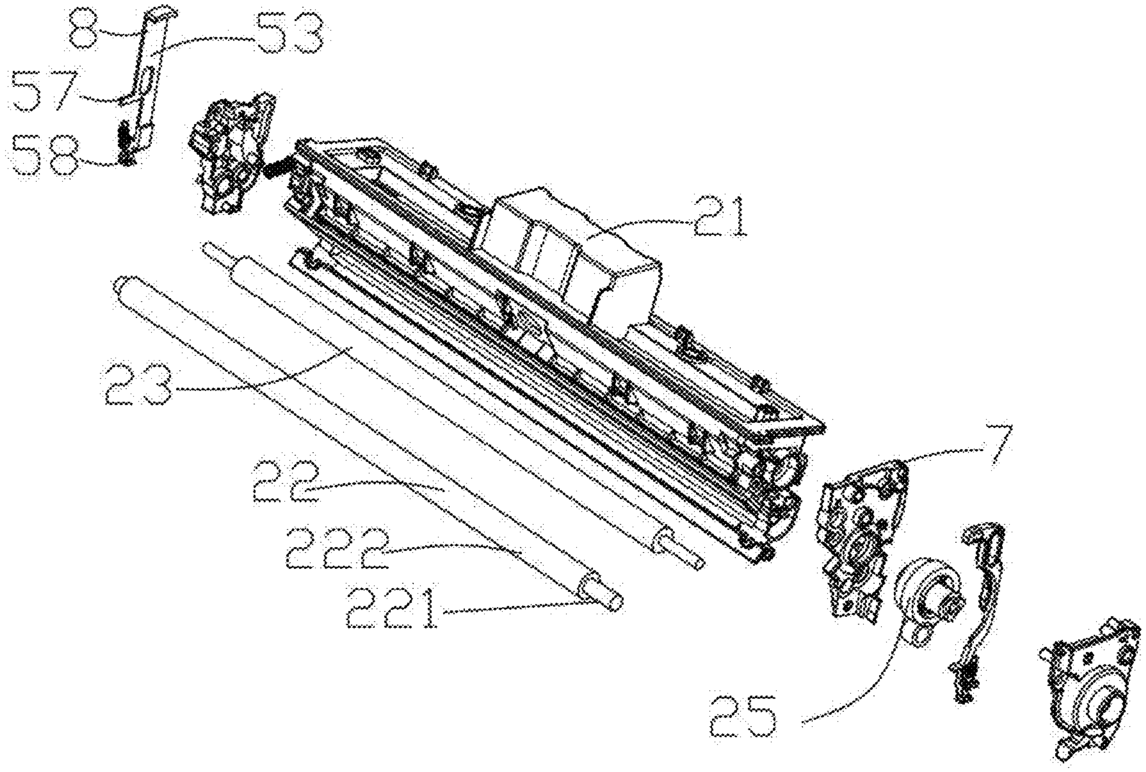
FIG. 8 is a partial exploded structural view of the developing unit of Embodiment 1.
Figure 9:
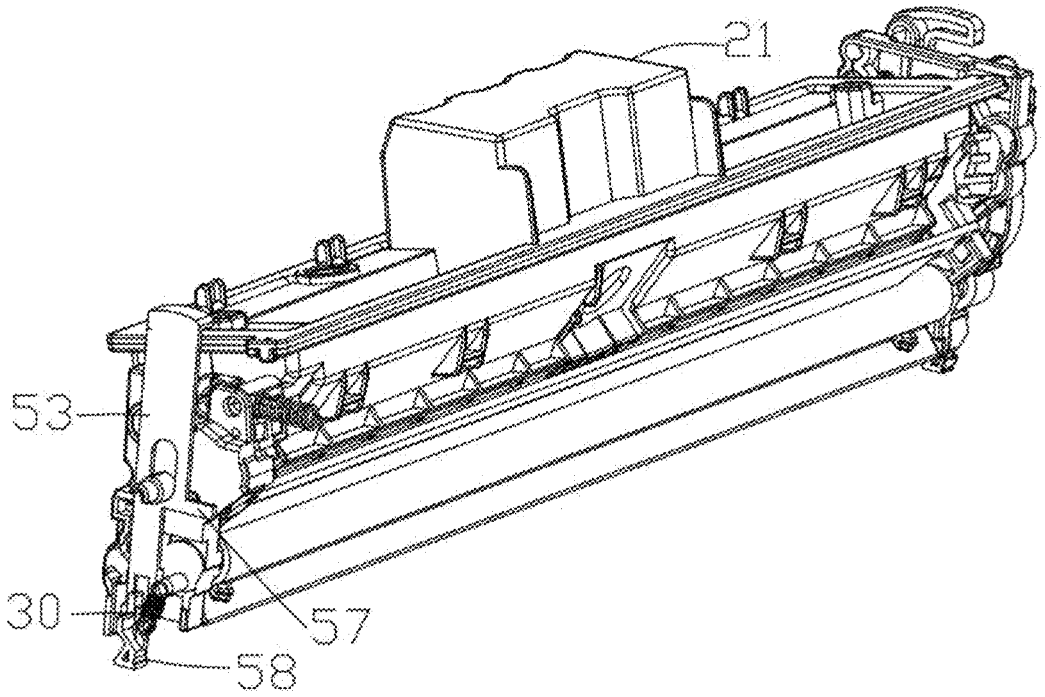
FIG. 9 is a structural schematic view of the developing unit of Embodiment 1.
Figure 10:
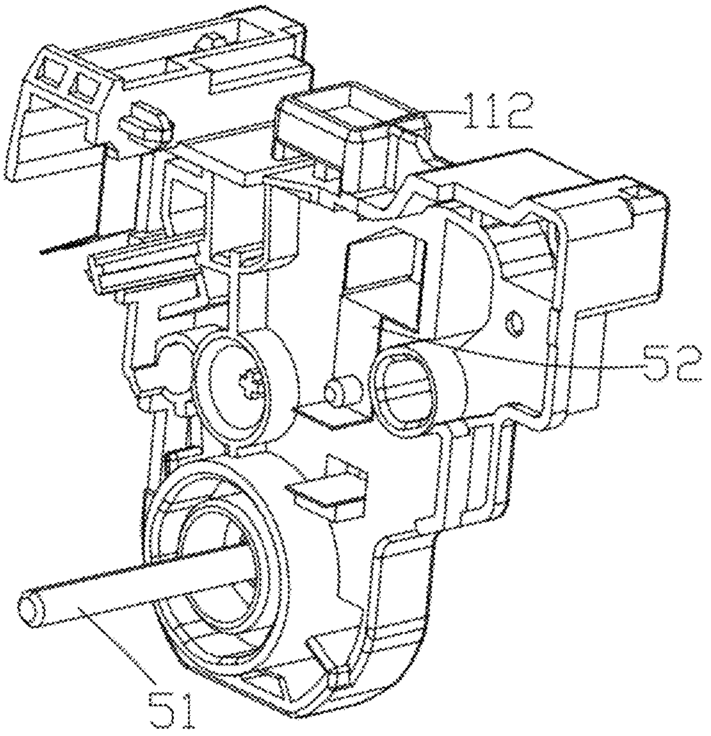
FIG. 10 is an assembly structural schematic view of a first cover member, power supply member, grounding member, and a first conductive component of Embodiment 1.
Figure 11:
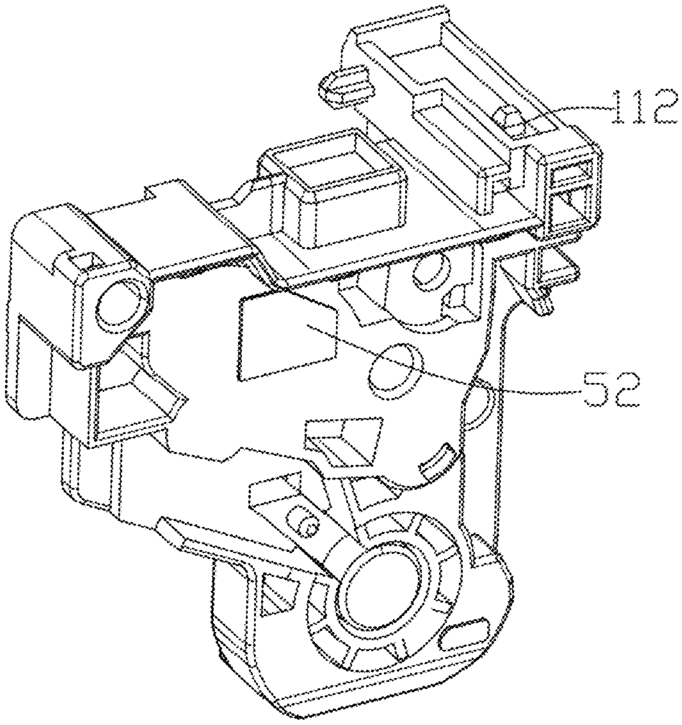
FIG. 11 is another perspective view of the assembly structure of the first cover member, power supply member, grounding member, and first conductive component of Embodiment 1.
Figure 12:
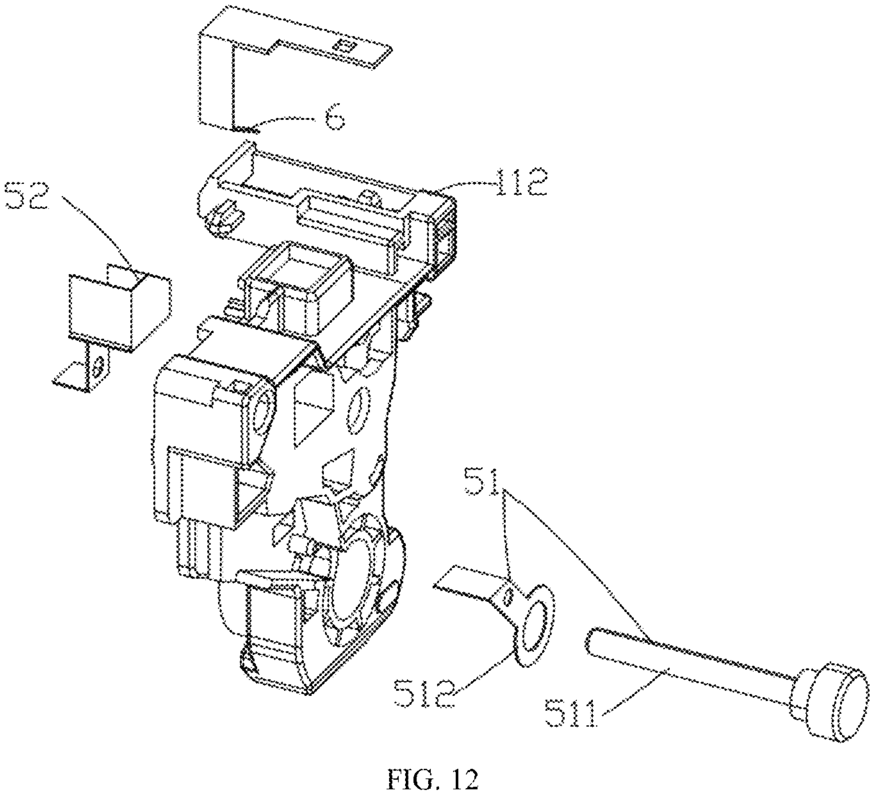
FIG. 12 is an exploded schematic view of the first cover member, power supply member, grounding member, and first conductive component of Embodiment 1.
Figure 13:
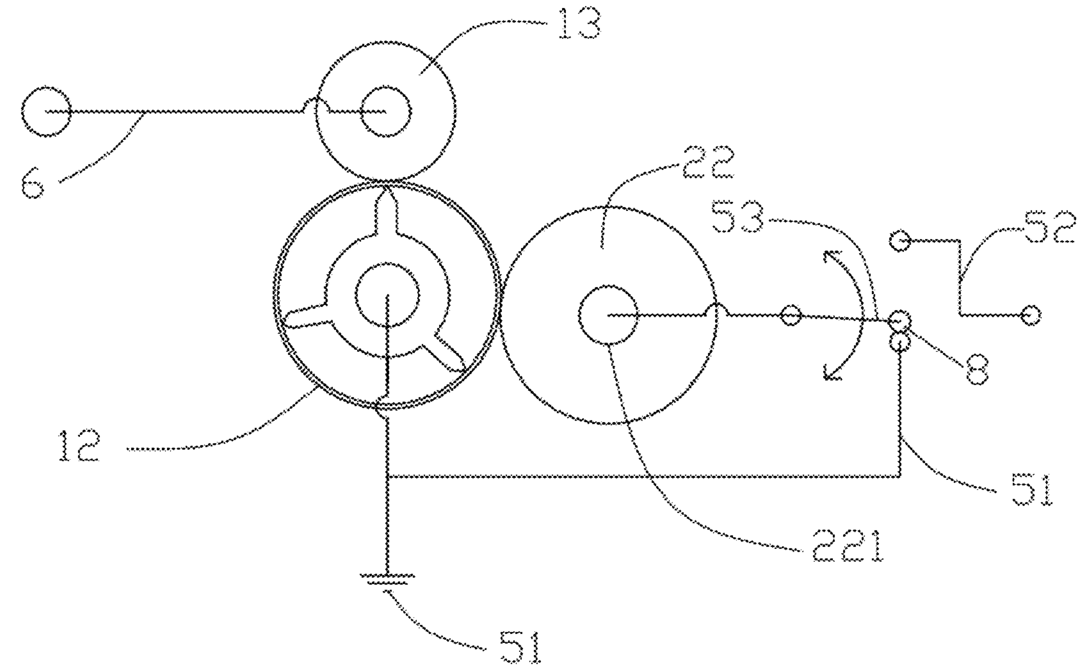
FIG. 13 is a schematic diagram of the local circuit principle when the connector is electrically connected to the grounding member in Embodiment 1.

The present application will be further described below in conjunction with the embodiments and their accompanying drawings FIG. 1 to FIG. 42.

Embodiment 1

As shown in FIG. 1 to FIG. 19, a process cartridge 10 includes a photosensitive unit 1 and a developing unit 2. The photosensitive unit 1 includes a photosensitive unit frame 11, a driving end 111, an electrical contact end 112, a photosensitive drum 12, a charging member 13, and a first driving unit 15. The driving end 111 and the electrical contact end 112 are respectively disposed at the two ends of the photosensitive unit frame 11 in the length direction thereof. The driving end 111 and the electrical contact end 112 may be regarded as part of the photosensitive unit frame 11, and they may be integrally formed with the photosensitive unit frame 11 or assembled separately. In this embodiment, the driving end 111 and the electrical contact end 112 are configured as a first cover member 111 and a second cover member 112, respectively, covering the ends of the photosensitive unit frame 11 and being capable of supporting the photosensitive drum 12 and the charging member 13.

The photosensitive drum 12 is rotatably supported on the photosensitive unit frame 11. The charging member is preferably a charging roller 13, and the charging roller 13 is rotatably supported on the photosensitive unit frame 11. The charging member 13 is configured to be in contact with the photosensitive drum 12 so as to be able to charge the photosensitive drum 12. The first driving unit 15 is disposed at one end of the photosensitive drum 12, configured to receive driving force from an imaging apparatus to drive the photosensitive drum 12 and the charging roller 13 to rotate.

The developing unit 2 includes a developing unit frame 21, a developing roller 22, a toner supply roller 23, and a second driving unit 25. The developing unit frame 21 is connected to the photosensitive unit frame 11. The developing roller 22 is rotatably supported on the developing unit frame 21 and makes the developing roller 22 and the photosensitive drum 12 contact each other, such that during an imaging operation, toner on the developing roller 22 can be transferred to the surface of the photosensitive drum 12. The developing roller 22 includes a developing roller shaft 221 and a first main body portion 222 supported on the developing roller shaft 221. The toner supply roller 23 is rotatably supported on the developing unit frame 21, capable of supplying toner to the developing roller 22. The second driving unit 25 is disposed at one end of the developing unit 2, configured to receive driving force from the imaging apparatus and supplying driving force to the developing roller 22 and the toner supply roller 23, enabling the developing roller 22 and the toner supply roller 23 to rotate.

In this embodiment, the process cartridge 10 further includes a first conductive assembly 6. The first conductive assembly 6 is capable of being electrically connected to the imaging apparatus and receive electrical power therefrom. More specifically, the first conductive assembly 6 is electrically connected to a charging electrode of the imaging apparatus. The first conductive assembly 6 is also capable of being electrically connected to the charging roller 13 to provide electrical power to the charging roller 13. The charging roller 13 charges the photosensitive drum 12 through contact therewith.

After repeated research and multiple experiments, it was found that in a process cartridge 10 using negatively charged toner, when the process cartridge 10 is in an imaging operation period, the charging roller 13 receives a voltage (e.g., −900V) from the charging electrode of the imaging apparatus. In the gap formed by the contact of the charging roller 13 with the photosensitive drum 12, air is ionized, generating electrons which are distributed onto the surface of the photosensitive drum 12, forming a voltage (e.g., −600V) on the surface of the photosensitive drum 12. During the imaging operation period, when the apparatus receives a print command, a laser emitter will emit laser light, which irradiates the surface of the photosensitive drum 12, causing the print area on the surface of the photosensitive drum 12 to be exposed, and leading to an increase in the voltage at the exposed location. The potential at the exposed location rises to above −300V, more preferably between approximately −200V and −100V. At this time, the developing roller 22 receives a developing voltage (e.g., −300V) from the apparatus. At this point, the voltage (e.g., −200V) of the exposed area on the photosensitive drum 12 is higher than the voltage (e.g., −300V) on the developing roller 22. The direction of the electric field at this time points towards the developing roller 22. The negatively charged toner will transfer from the developing roller 22 to the exposed location on the surface of the photosensitive drum 12, thereby obtaining a print image. In the non-exposed area, the surface voltage (e.g., −600V) of the photosensitive drum 12 is lower than the surface voltage (e.g., −300V) of the developing roller 22. The direction of the electric field in this area points towards the photosensitive drum 12. Therefore, the electric field force received by the negatively charged toner in this area points towards the developing roller 22, and the toner on the surface of the developing roller 22 will not transfer to the surface of the photosensitive drum 12, thus resulting in no toner deposition in the non-print area. When the process cartridge 10 is in a non-imaging operation period (e.g., cleaning state), the voltage supplied to the developing roller 22 is cut off. However, typically, the developing electrode is an open-circuit electrode. Therefore, because the developing roller 22 remains in contact with the photosensitive drum 12, the photosensitive drum 12 can transfer electrical power to the developing roller 22 through the conductive effect of the toner, causing the developing roller 22 to maintain a certain amount of charge. As a result, the potential difference between the surface of the developing roller 22 and the surface of the photosensitive drum 12 is very small, or sometimes the electric field direction will point towards the developing roller 22. At this time, the negatively charged toner on the developing roller 22, under the action of frictional shear force between the photosensitive drum 12 and the developing roller 22 or under the action of a reverse electric field force, can transfer to the surface of the photosensitive drum 12, causing the photosensitive drum 12 to be contaminated by toner, which in turn causes toner to adhere to the transfer belt, thereby leading to incomplete cleaning of the photosensitive drum 12 and/or the transfer belt, resulting in print defects.

To address the aforementioned defect, the present embodiment provides a new technical solution.

As shown in FIG. 1 to FIG. 12, the process cartridge 10 of this embodiment further includes an electrical switching assembly 5. The electrical switching assembly 5 includes a voltage regulating member, a power supply member 52, and a connector 53. The voltage regulating member is capable of adjusting the voltage supplied to the developing roller 22, this voltage being different from the voltage supplied by the power supply member 52. Preferably, the voltage regulating member is a grounding member 51. The connector 53 is capable of being electrically connected to the developing roller 22. At least a portion of the connector 53 is movable between a first position where it contacts the power supply member 52 and a second position where it contacts the grounding member 51.

In other words, at least a portion of the connector 53 is movable between a first position where it is electrically connected to the power supply member 52 and a second position where it is electrically connected to the grounding member 51.

Specifically, the following description takes an imaging apparatus system supplying negative charge and using negatively charged toner as an example.

In this embodiment, the electrical switching assembly 5 is disposed at the electrical contact end (the end where the electrical contact end 112 is located) of the process cartridge 10.

Figure 18:
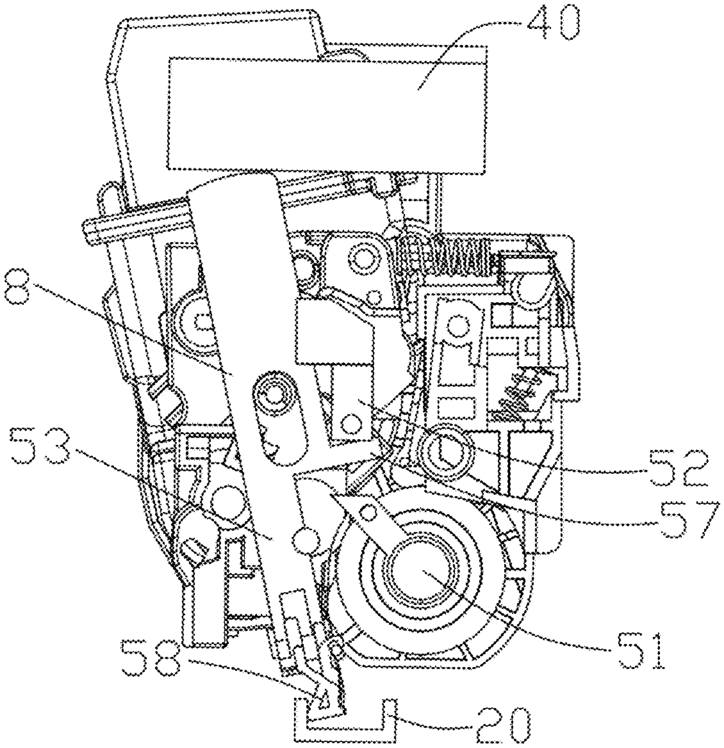
FIG. 18 is a schematic view showing the cooperative relationship between the actuating member and the electrical switching assembly when the process cartridge of Embodiment 1 is in an imaging operation state.
Figure 19:
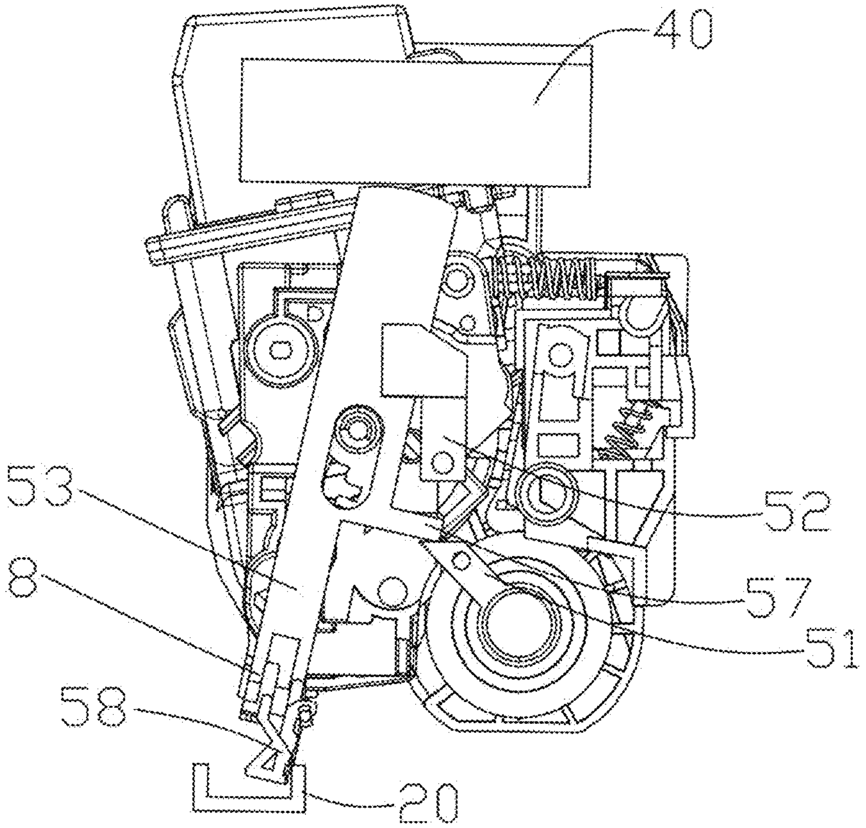
FIG. 19 is a schematic view showing the cooperative relationship between the actuating member and the electrical switching assembly when the process cartridge of Embodiment 1 is in a cleaning operation state.
Figure 20:
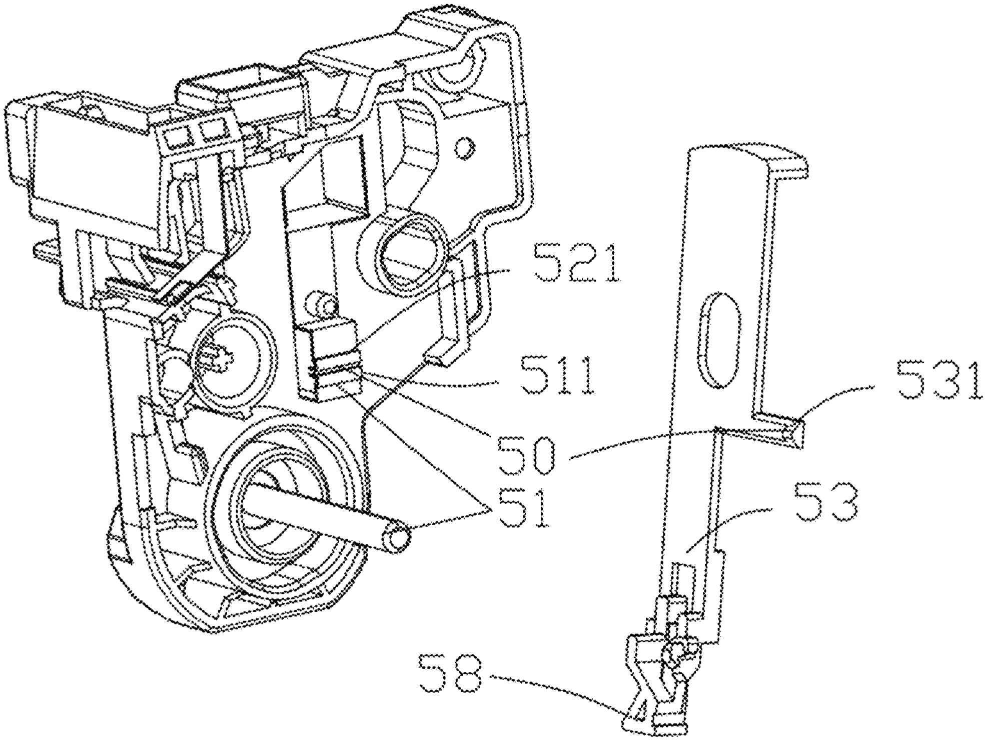
FIG. 20 is a structural schematic view of the electrical switching assembly of the process cartridge of Embodiment 2.

Combining FIG. 18 and FIG. 19, the power supply member 52 is electrically connectable to the imaging apparatus. More specifically, the power supply member 52 is electrically connected to the developing electrode or supply electrode of the imaging apparatus. During the imaging operation period, at least a portion of the connector 53 is at the first position, the connector 53 contacting the power supply member 52, thereby causing the developing roller 22 to be charged. At this time, the voltage of the developing roller 22 is lower than the voltage of the exposed location on the photosensitive drum 12. The direction of the electric field formed between the exposed area and the developing roller 22 points towards the developing roller 22. At this time, under the action of the electric field force pointing towards the photosensitive drum 12, the negatively charged toner can transfer from the developing roller 22 to the exposed location on the photosensitive drum 12, thereby developing an electrostatic latent image. Preferably, the power supply member 52 is disposed on the second cover member 112, and at least a portion thereof is exposed outwards from the second cover member 112. When the process cartridge 10 is installed into the imaging apparatus, the power supply member 52 is capable of contacting an electrical power component within the main assembly of the imaging apparatus, so as to be able to receive electrical power. Preferably, the power supply member 52 may be made of a conductive metal part or conductive resin, and it may be integrally formed with the second cover member 112, or it may be provided separately.

The grounding member 51 is configured for grounding, specifically by being electrically connected to the imaging apparatus for grounding. During the cleaning operation period of the process cartridge and the imaging apparatus, at least a portion of the connector 53 is at the second position, the connector 53 connecting the grounding member 51. At this time, the voltage on the developing roller 22 is pulled high to 0V. The result is that the voltage (e.g., −600V) on the photosensitive drum 12 is lower than the voltage (e.g., 0V) on the developing roller 22. At this time, the direction of the electric field formed between the developing roller 22 and the photosensitive drum 12 points towards the photosensitive drum. The electric field force received by the negatively charged toner points towards the developing roller 22. Therefore, the negatively charged toner adhering to the developing roller 22, under the action of the electric field force, cannot transfer onto the photosensitive drum 12, thereby avoiding contamination of the photosensitive drum 12.

Preferably, at least a portion of the grounding member 51 is exposed outwards from the second cover member 112. When the process cartridge 10 is installed into the imaging apparatus, at least a portion of the grounding member 51 electrically connects to a grounding assembly within the main assembly of the imaging apparatus to achieve grounding. Specifically, the grounding member 51 includes a first grounding piece 511 and a second grounding piece 512. One end of the first grounding piece 511 passes through a hole in the second cover member 112 and is inserted into the photosensitive drum 12. The other end of the first grounding piece 511 is configured to be electrically connected to the grounding assembly (not shown in the figure) within the main assembly of the imaging apparatus, which enables the photosensitive drum 12 to be grounded. One end of the second grounding piece 512 is electrically connected to the first grounding piece 511, and the other end is configured to electrically connect to or disconnect from the connector 53. Preferably, the first grounding piece 511 is a conductive shaft pin inserted into the photosensitive drum 12.

In this embodiment, the connector 53 has a first connection end 56, a second connection end 57, and a force receiving end 58. The first connection end 56 is electrically connected to the developing roller shaft 221. The second connection end 57 is movable between a first position contacting the power supply member 52 and a second position contacting the grounding member 51. When the connector 53/second connection end 57 is at the first position, the developing roller 22 has a first voltage value. When the connector 53/second connection end 57 is at the second position, the developing roller 22 has a second voltage value. The absolute value of the first voltage value is greater than the absolute value of the second voltage.

Specifically, the connector 53 includes a first connector piece 7 and a second connector piece 8. The first connector piece 7 is configured to support the developing roller shaft 221. The first connection end 56 is disposed on the first connector piece 7. The first connector piece 7 is installed at one end of the developing unit frame 21. The developing roller shaft 221 is rotatably supported on the first connector piece 7, and an electrical connection is formed between the two. The first connection end 56 is disposed on the first connector piece 7 and contacts the developing roller shaft 221. The first connector piece 7 is made of a conductive material. In some implementations, the first connector piece 7 does not necessarily need to be configured as a component supporting the developing roller shaft 221; it can be other conductive member electrically connectable to the developing roller 22, such as a conductive metal sheet or conductive wire, etc.

In some implementations, the first conductive assembly 6 electrically connects to the imaging apparatus. The voltage applied by the imaging apparatus to the first conductive assembly 6 is approximately between −800V and −1200V, more preferably about −900V. The first conductive assembly 6 transmits this voltage to the charging member 13. The charging member 13 contacts the photosensitive drum 12, ionizing the air in the gap between them, generating electrons which are distributed onto the surface of the photosensitive drum 12. At this time, the surface of the photosensitive drum 12 carries a voltage of approximately −600V. The second connector piece 8 is electrically connected to the first connector piece 7 and is capable of moving under the action of external force. The second connection end 57 and the force receiving end 58 are disposed on the second connector piece 8, wherein the second connection end 57 is used for electrical connection with the grounding member 51 or the power supply member 52.

When a print command is executed, the imaging apparatus, after receiving the print command, will emit laser light, irradiating certain print areas on the surface of the photosensitive drum 12. After the print areas of the photosensitive drum 12 are exposed, the voltage will rise to above −300V, preferably between approximately −200V and −100V. The second connection end 57 connects to the power supply member 52. The developing roller 22 is supplied with a developing voltage (e.g., −300V, absolute voltage value is 300V) by the apparatus. At this time, the developing roller 22 has the first voltage. The voltage on the developing roller 22 at this time is lower than the voltage (e.g., −200V, absolute voltage value is 200V) at the exposed location on the photosensitive drum 12. The direction of the electric field at this time points towards the developing roller 22. The negatively charged toner receives an electric field force pointing towards the photosensitive drum 12. The toner can transfer from the developing roller 22 to the exposed area of the photosensitive drum 12, thereby forming a toner image. For the non-exposed area of the photosensitive drum 12, the voltage remains below −300V (e.g., −600V) for a certain period. At this time, the direction of the electric field formed between this area and the developing roller 22 points towards the photosensitive drum 12. The electric field force received by the negatively charged toner points towards the developing roller 22. Therefore, the toner on the developing roller 22 in this area cannot transfer to the non-exposed area of the photosensitive drum 12.

After the print command is completely executed (when performing cleaning operation), the second connection end 57 connects to the grounding member 51. The voltage on the developing roller 22 is pulled high to 0V. At this time, the developing roller 22 has the second voltage, and the absolute value of the second voltage is 0V. In this state, the developing roller 22 contacts the photosensitive drum 12. Even if the photosensitive drum 12 transfers charge to the developing roller 22, because the developing roller 22 is grounded, the potential of the developing roller 22 is maintained at 0V. Therefore, regardless of whether exposure occurs on the surface of the photosensitive drum 12, it can be ensured at this time that the voltage of the photosensitive drum 12 is lower than the voltage of the developing roller 22. The direction of the electric field always points towards the photosensitive drum 12. The negatively charged toner receives an electric field force pointing towards the developing roller 22. At this time, the toner will not transfer from the surface of the developing roller 22 onto the surface of the photosensitive drum 12.

The force receiving end 58 is used for receiving an actuating force from an actuating member 20 of the imaging apparatus, thereby causing at least a portion (the second connector piece 8) of the connector 53 to move between the first position and the second position. Specifically, the second connector piece 8 is capable of moving between the first position and the second position upon receiving the actuating force from the actuating member 20 of the imaging apparatus. Specifically, the second connector piece 8 is rotatably supported at one end of the process cartridge 10. The second connector piece 8 is generally rod-shaped, the force receiving end 58 is disposed at the lower end of the rod. The second connection end 57 extends from the upper side of the rod towards the side near the photosensitive unit, and is configured to swing following the swing of the second connector piece 8.

Combining FIG. 15 to FIG. 19, during an imaging operation of one type of imaging apparatus, the actuating member 20 applies force to the second connector piece 8, causing the second connector piece 8 to rotate to the first position (position shown in FIG. 18). During a non-imaging operation (during cleaning), the actuating member 20 applies force to the second connector piece 8, causing the second connector piece 8 to rotate to the second position (position shown in FIG. 19). Specifically, when the process cartridge 10 is in the imaging operation state, the actuating member 20 moves in the direction towards the photosensitive drum 12 and applies force to the force receiving end 58, causing the second connector piece 8 to rotate to the position where it contacts the power supply member 52. When the process cartridge 10 is in the cleaning operation state, the actuating member 20 moves in the direction away from the photosensitive drum 12 and applies force to the force receiving end 58, causing the second connector piece 8 to rotate to the position where it contacts the grounding member 51.

Optionally, the second connector piece 8 may also include a conductive portion and a non-conductive portion. The conductive portion is used for electrical connection between the developing roller 22 and the power supply member 52 or the grounding member 51. For example, the force receiving end 58 can be configured of a non-conductive material.

Figure 15:
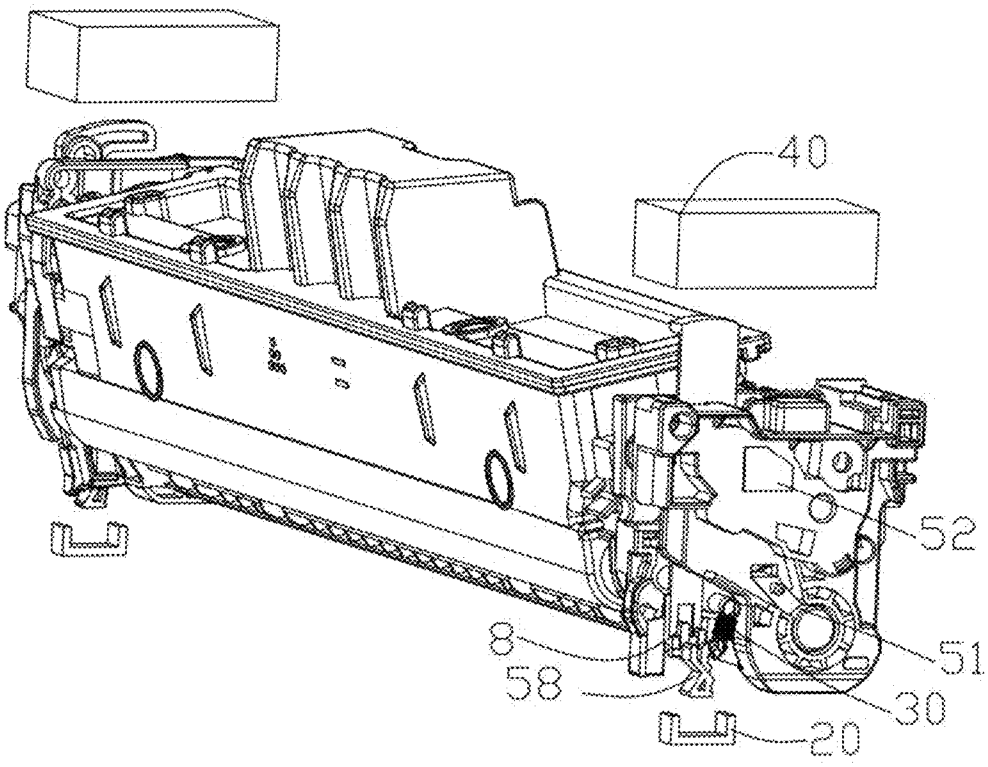
FIG. 15 is a schematic view showing the cooperative relationship between the force receiving end and the actuating member when the process cartridge of Embodiment 1 is installed in an imaging apparatus but the door cover is not closed.
Figure 17:
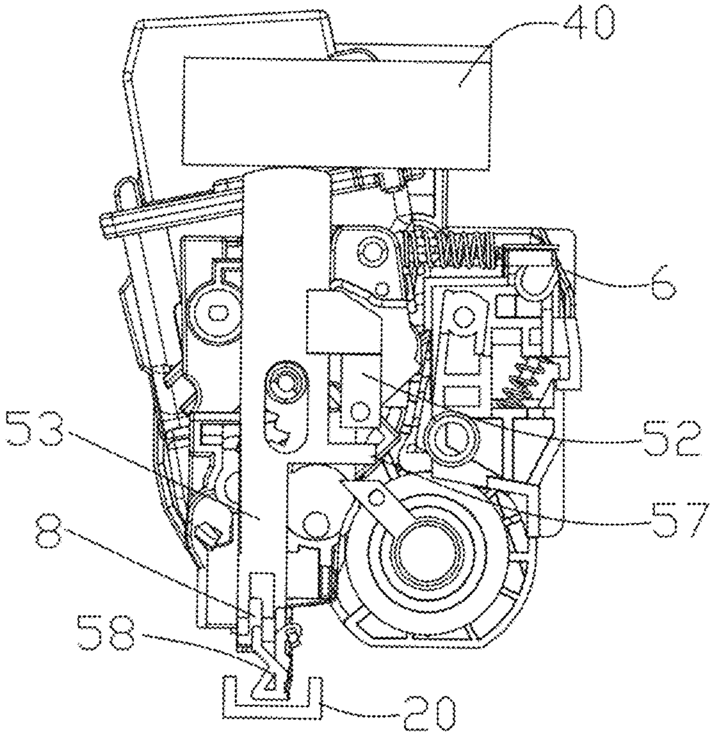

In some implementations, the force receiving end 58 is configured to be movable between a protruding position and a retracted position. In the protruding position (the position where the force receiving end 58 is shown in FIG. 17), the force receiving end 58 is configured to receive the actuating force from the actuating member 20. In the retracted position (the position where the force receiving end 58 is shown in FIG. 15), the force receiving end 58 is closer to the inside of the frame compared to the protruding position. In other words, in the retracted position, the force receiving end 58 is closer to the developing unit frame 21 compared to the protruding position. This structural design can avoid interference with the imaging apparatus when installing the process cartridge 10. Specifically, the process cartridge 10 further includes an elastic member 30. This elastic member 30 is used to keep the force receiving end 58 in the retracted position. Preferably, one end of the elastic member 30 is connected to the second connector piece 8, and the other end is connected to the developing unit frame 21. When the second connector piece 8 is pressed by a pressing mechanism of the imaging apparatus, the second connector piece 8 overcomes the force of the elastic member 30 and moves downward, causing the force receiving end 58 to move from the retracted position to the protruding position.

In some implementations, the force receiving end 58 may also be configured as a component that moves relative to the developing unit frame 21, for example, it may be a swinging lever or a free gravity block structure. This structure can move when it touches an obstacle, thereby avoiding interference from the obstacle. This not only allows the process cartridge 10 to be smoothly installed into the apparatus, but also meets the requirement of receiving the action of the apparatus's actuating member 20, enabling at least a portion (the second connector piece 8) of the connector to move between the first position and the second position. This structural solution has a simpler structure.

Next, the cooperation process of the various components of the process cartridge 10 during imaging and cleaning operations is described in detail with reference to FIG. 13 to FIG. 19.

As shown in FIG. 15, when the process cartridge 10 is installed into the imaging apparatus and the door cover is not closed, a pressing member 40 of the imaging apparatus is located above the process cartridge 10. The second connector piece 8 is not pressed by the pressing member 40, and the force receiving end 58 is in the retracted position. The second connector piece 8 is in an initial position where it is not connected to the power supply member 52 and the grounding member 51.

Figure 16:
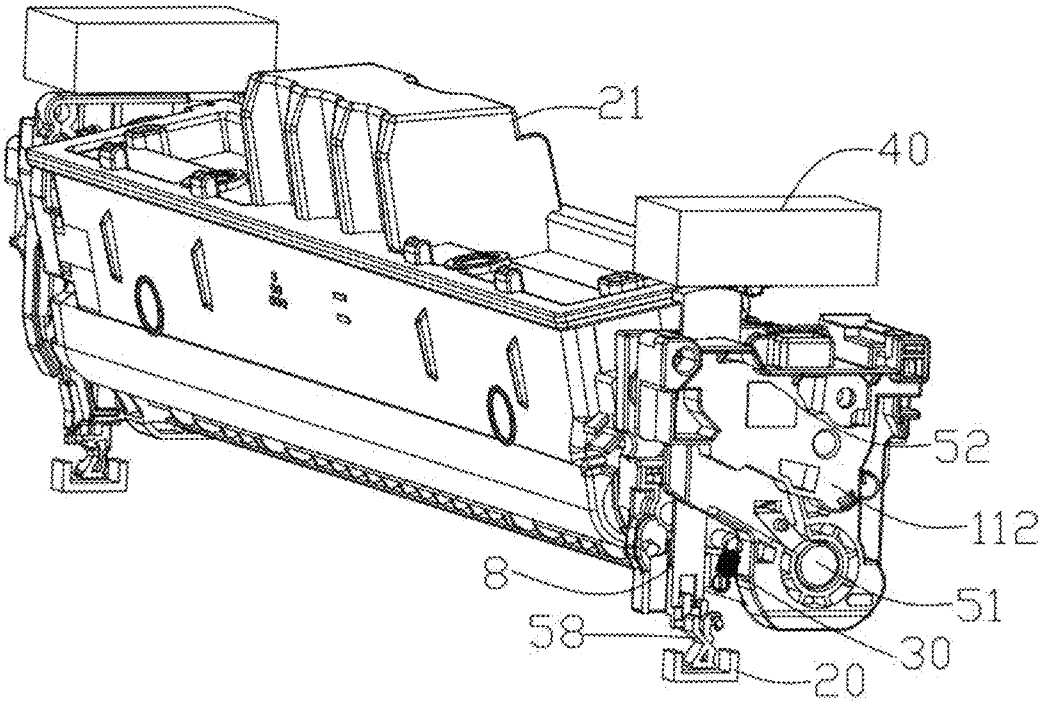
FIG. 16 and FIG. 17 are schematic views showing the cooperative relationship between the connector and the actuating member after the process cartridge of Embodiment 1 is installed in the imaging apparatus and the door cover is closed.

As shown in FIG. 16 to FIG. 17, after the door cover of the imaging apparatus is closed, the pressing member 40 moves downward and presses the second connector piece 8. The second connector piece 8 overcomes the force of the elastic member 30 and moves downward. The force receiving end 58 moves from the retracted position to the protruding position. In this protruding position, the force receiving end 58 is capable of receiving the actuating force from the actuating member 20. The second connector piece 8 remains in the initial position where it is not electrically connected to the power supply member 52 and the grounding member 51. The first conductive assembly 6 contacts the imaging apparatus and receives electrical power. The charging roller 13 receives electrical power and charges the photosensitive drum 12.

Figure 14:
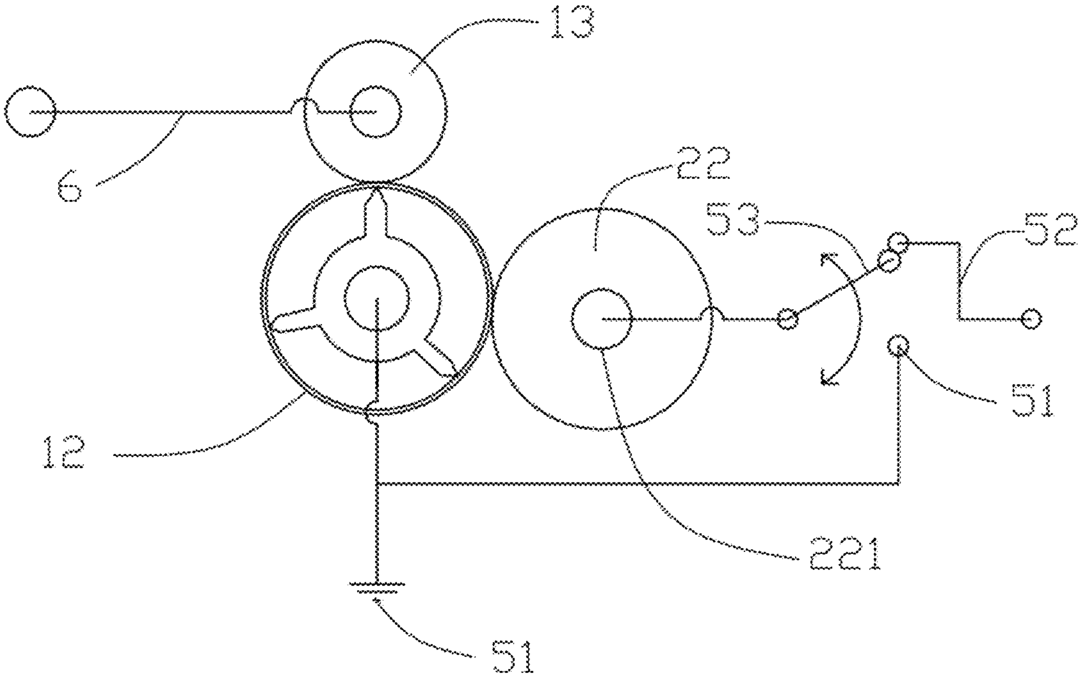
FIG. 14 is a schematic diagram of the local circuit principle when the connector is electrically connected to the power supply member in Embodiment 1.

As shown in FIG. 14 and FIG. 18, when the process cartridge 10 needs to perform an imaging operation, the actuating member 20 moves in the direction towards the photosensitive drum 12 and pushes the force receiving end 58. The second connector piece 8 rotates to the first position. At this time, the second connector piece 8 is electrically connected to the power supply member 52. The developing roller 22 is in a non-grounded state. At this time, the developing roller 22 is capable of receiving electrical power (e.g., −300V voltage) from the developing electrode of the apparatus. After the photosensitive drum 12 is exposed, the voltage (e.g., −200V) of the exposed position on its surface is higher than the voltage of the developing roller 22. The direction of the electric field between the photosensitive drum 12 and the developing roller 22 points towards the developing roller 22. At this time, the negatively charged toner on the developing roller 22 receives an electric field force pointing towards the photosensitive drum 12. Therefore, the negatively charged toner on the surface of the developing roller 22 can transfer to the exposed location on the surface of the photosensitive drum 12.

As shown in FIG. 14 and FIG. 19, when the process cartridge 10 needs to perform a cleaning operation, the actuating member 20 moves in the direction away from the photosensitive drum 12 and pushes the force receiving end 58. The second connector piece 8 rotates to the second position. At this time, the second connector piece 8 connects to the grounding member 51. The developing roller 22 is grounded, and the voltage of the developing roller 22 is 0V. At this time, even if the developing roller 22 contacts the surface of the photosensitive drum 12, partial charge on the surface of the photosensitive drum 12 is conducted to the developing roller 22 through the toner on the surface of the developing roller 22. Due to the grounding, the charge is conducted away. At this time, the voltage value of the developing roller 22 is higher than the voltage value (e.g., −600V) on the photosensitive drum 12. Therefore, the negatively charged toner on the developing roller 22 cannot transfer to the surface of the photosensitive drum 12, thereby avoiding unnecessary toner deposition on the photosensitive drum 12 and avoiding contamination of the transfer belt. At the same time, there is no need to separate the photosensitive drum 12 and the developing roller 22, simplifying the complex separation mechanism.

During the process of switching the second connector piece 8 between the first position and the second position, there exists a third position where the second connector piece 8 is simultaneously not electrically connected to the grounding member 51 and the power supply member 52. That is, the second connector piece 8 passes through the third position during the movement between the first position and the second position, but in some cases, the duration of stay at the third position is relatively short.

In some implementations, when the process cartridge is not installed into the imaging apparatus, the second connector piece 8 is in any one of the first position, the second position, or the third position.

In some implementations, during the process of switching the connector 53 from the first position to the second position, the duration for which the second connection end 57 is electrically connected to the grounding member 51 is longer than the duration for which the second connection end 57 is electrically connected to the power supply member 52.

In some implementations, the initial position of the second connector piece 8 may be the first position or the second position.

In some implementations, the electrical switching assembly may be disposed on the driving end side of the process cartridge 10.

In some implementations, the process cartridge 10 further includes a voltage stabilizing element, which is capable of keeping the voltage supplied to the developing roller 22 stable.

In some implementations, the grounding member 51 does not necessarily need to be configured for grounding, but is connected to a voltage reduction unit or a voltage boost unit, such that the voltage value on the developing roller 22 is maintained higher than the voltage on the surface of the photosensitive drum 12; in other words, the grounding member, the voltage reduction unit, or the voltage boost unit constitutes the voltage regulating member.

In some implementations, the voltage regulating member does not necessarily make the developing roller 22 voltage 0V, as long as the developing roller 22 voltage is made higher than the photosensitive drum 12 voltage, the electric field direction is from the developing roller 22 towards the photosensitive drum 12, and the force received by the toner points towards the developing roller 22.

In some implementations, the voltage regulating member does not necessarily make the developing roller 22 voltage 0V, as long as the voltage supplied by the voltage regulating member to the developing roller 22 can weaken the potential difference between the developing roller 22 and the photosensitive drum, such that the electric field direction is from the photosensitive drum towards the developing roller 22, and the force received by the toner is insufficient to cause the toner to move from the developing roller 22 to the photosensitive drum 12.

In some embodiments, the electrical switching assembly may also be configured to control whether the photosensitive drum 12 is grounded to achieve the potential difference between the developing roller 22 and the photosensitive drum 12, as long as the electric field force is insufficient to cause the charged toner to transfer from the surface of the developing roller 22 onto the photosensitive drum 12. More specifically, the electric field force received by the charged toner particles is able to overcome the frictional shear force between the developing roller 22 and the photosensitive drum 12, or the sum of the electric field force received by the charged toner particles and the frictional shear force between the developing roller 22 and the photosensitive drum 12 cannot overcome the attractive force (adhesion force) between the charged toner particles and the developing roller 22, thereby preventing the toner from transferring from the surface of the developing roller 22 to the surface of the photosensitive drum 12.

In some implementations, the first connector piece 7 and the second connector piece 8 may be integrally formed.

In some implementations, the voltage regulating member, the power supply member 52, and the connector 53 are not entirely composed of conductive material, for example, having conductive portions and non-conductive portions, where the conductive portions are used for conduction, and the non-conductive portions are used for supporting the conductive portions or mounting the conductive portions.

This embodiment is described using negatively charged toner as an example. Those skilled in the art, based on the technical solution of this embodiment, can readily conceive improvements to the process cartridge when using positively charged toner, as long as during non-imaging operation periods, the force received by the positively charged toner points towards the developing roller 22, or points towards the photosensitive drum 12, but this force is insufficient to cause the toner to move onto the surface of the photosensitive drum 12.

Embodiment 2

The process cartridge of this embodiment is a further optimization based on Embodiment 1. Its shape and structure are fundamentally the same as the shape and structure of the process cartridge 10 of Embodiment 1. Identical parts will not be described again, and the main differences will be introduced below. Components identical to those in Embodiment 1 retain the reference numerals of Embodiment 1.

As shown in FIG. 20 to FIG. 27, in this embodiment, the process cartridge 10 further includes a holding mechanism 50. This holding mechanism 50 is configured to enable the connector 53 to maintain a stable electrical connection with the power supply member 52 during imaging operation; and enabling the connector 53 to maintain a stable electrical connection with the grounding member 51 during cleaning operation.

Specifically, the holding mechanism 50 includes an engagement part 531 disposed on the connector 53, a first engaged part 521 disposed on the power supply member 52, and a second engaged part 511 disposed on the grounding member 51. When the connector 53 receives the actuating force from the actuating member 20 and moves to the first position, the engagement part 531 abuts against and is held by the first engaged part 521. The connector 53 maintains electrical connection with the power supply member 52. At this time, regardless of whether the actuating member 20 continuously applies force to the connector 53, the connector 53 and the power supply member 52 can both maintain electrical connection. Specifically, the first engaged part 521 and the second engaged part 511 can be configured in a step-like shape.

When the connector 53/second connector piece 8 receives the actuating force from the actuating member 20 and moves from the first position to the second position, the engagement part 531 abuts against and is held by the second engaged part 511. The connector 53/second connector piece 8 maintains electrical connection with the grounding member 51. At this time, regardless of whether the actuating member 20 continuously applies force to the connector 53/second connector piece 8, the connector 53/second connector piece 8 and the grounding member 51 can both maintain electrical connection.

With this structure of the process cartridge 10, the electrical connection of the connector 53 with the grounding member 51 and the power supply member 52 is more stable.

Specifically, the engagement part 531 is configured as a protruding structure. At least one among the engagement part 531, the first engaged part 521, and the second engaged part 511 is an elastic member. More preferably, the engagement part 531 is an elastic conductive body, for example, a metal elastic piece.

The process cartridge 10 having the above structure can be universally applied to multiple types of imaging apparatuses. In other words, the process cartridge 10 of this embodiment can not only be applied to the imaging apparatus of Embodiment 1, but can also be applied to another type of imaging apparatus. The movement process of the actuating member 20 of the imaging apparatus of this embodiment is different from that of the imaging apparatus of Embodiment 1. Specifically, it is described in detail below in conjunction with FIG. 21 to FIG. 27.

Figure 21:
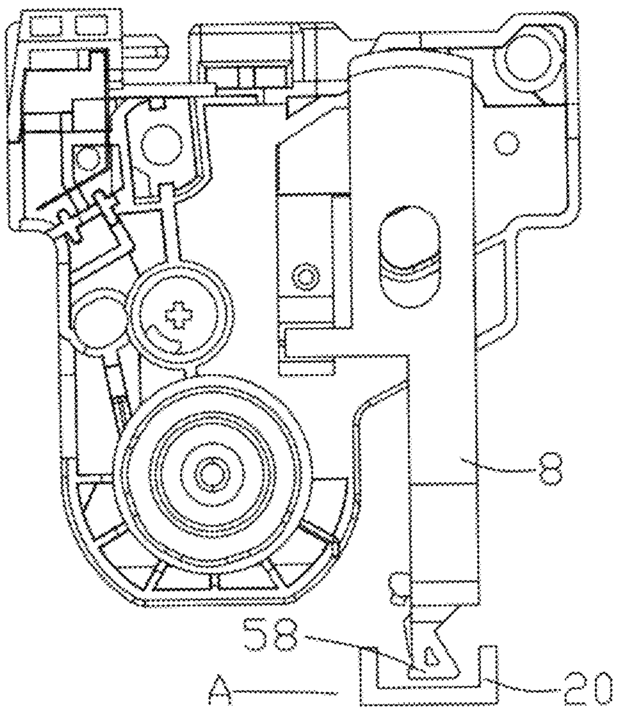
FIG. 21 is a schematic view showing the cooperative relationship between the force receiving end and the actuating member after the process cartridge of Embodiment 2 is installed in an imaging apparatus and the door cover is closed.

As shown in FIG. 21, the actuating member 20 has a first actuating part 201 and a second actuating part 202. The first actuating part 201 and the second actuating part 202 are separated by a preset distance, forming an interval space 203. The actuating member 20 has three positions during its movement process, namely a third position A, a fourth position B, and a fifth position C. The third position A is located between the fourth position B and the fifth position C. The fourth position B is closer to the photosensitive drum 12 relative to the fifth position C. When the process cartridge 10 is installed into the main assembly of the imaging apparatus and the door cover is closed, the force receiving end 58 of the process cartridge 10 is inserted into the interval space.

Figure 22:
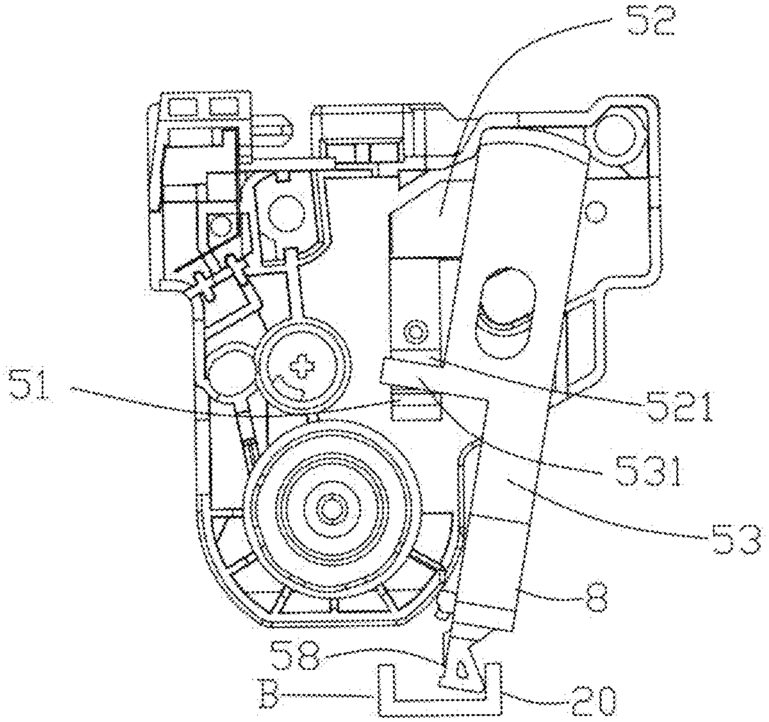
FIG. 22 is a schematic view showing the cooperative relationship between the actuating member and the electrical switching assembly when the process cartridge of Embodiment 2 is in an imaging operation state (actuating member at a fourth position)
Figure 23:
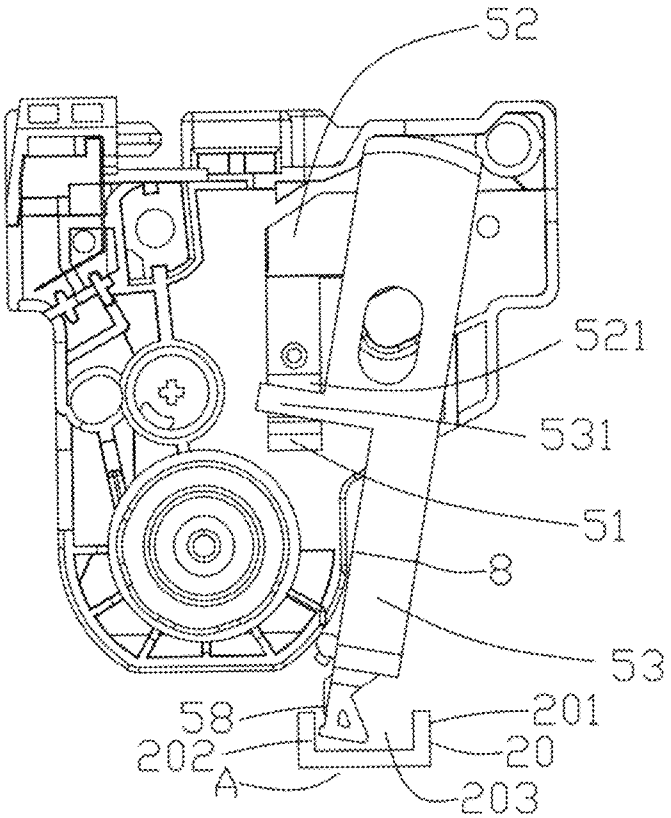
FIG. 23 is a schematic view showing the cooperative relationship between the actuating member and the electrical switching assembly when the process cartridge of Embodiment 2 is in an imaging operation state (actuating member at a third position)
Figure 24:
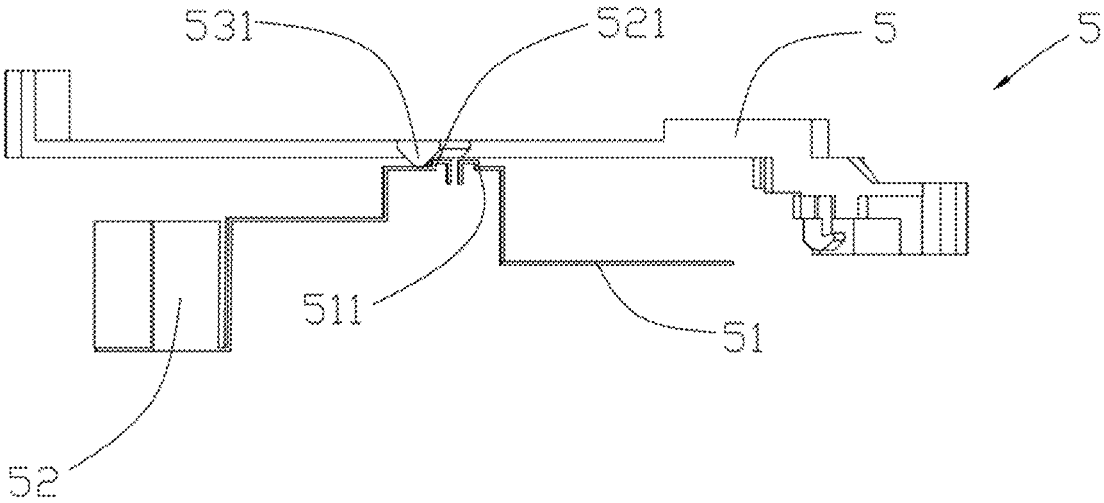
FIG. 24 is a schematic view showing the cooperative relationship between the connector and the power supply member when the process cartridge of Embodiment 2 is in an imaging operation state.

As shown in FIG. 22 to FIG. 24, when the process cartridge 10 needs to perform an imaging operation, the actuating member 20 moves to the fourth position B and applies force to the force receiving end 58. The second connector piece 8 rotates to the first position. At this time, the engagement part 531 abuts against and is held by the first engaged part 521. The second connector piece 8 electrically connects to the power supply member 52. At this time, the developing roller 22 is configured to receive electrical power (e.g., −300V voltage). Subsequently, the actuating member 20 moves from the fourth position B to the third position A. The actuating member 20 no longer applies force to the force receiving end 58. Because the engagement part 531 abuts against and is held by the first engaged part 521, the connection between the connector 53 and the power supply member 52 remains stable. After the photosensitive drum 12 is exposed, the voltage (e.g., −200V) of the exposed location on its surface is higher than the voltage of the developing roller 22. At this time, the negatively charged toner on the developing roller 22 can transfer to the exposed location on the surface of the photosensitive drum 12.

Figure 25:
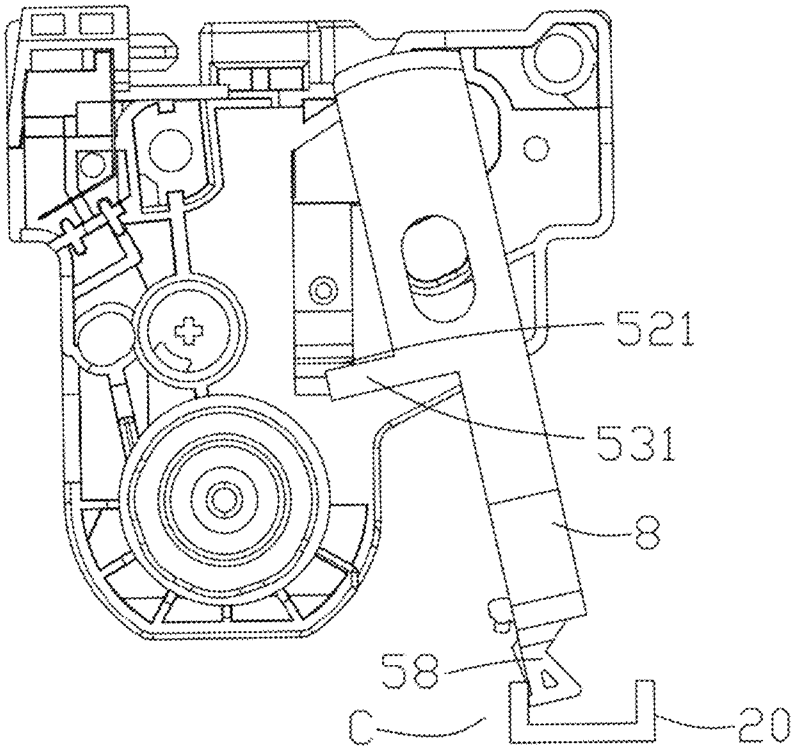
FIG. 25 is a schematic view showing the cooperative relationship between the actuating member and the electrical switching assembly when the process cartridge of Embodiment 2 is in a cleaning operation state (actuating member at a fifth position)
Figure 26:
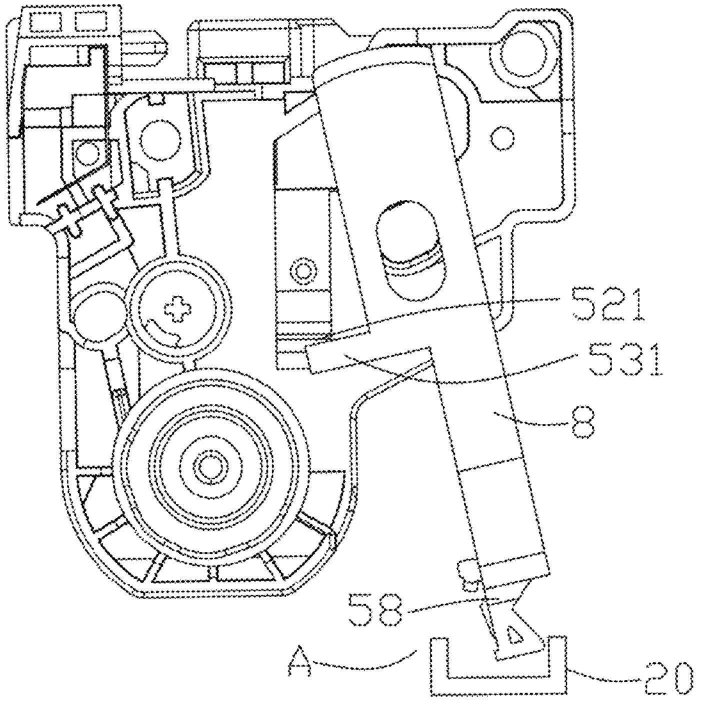
FIG. 26 is a schematic view showing the cooperative relationship between the actuating member and the electrical switching assembly when the process cartridge of Embodiment 2 is in a cleaning operation state (actuating member at a third position)
Figure 27:
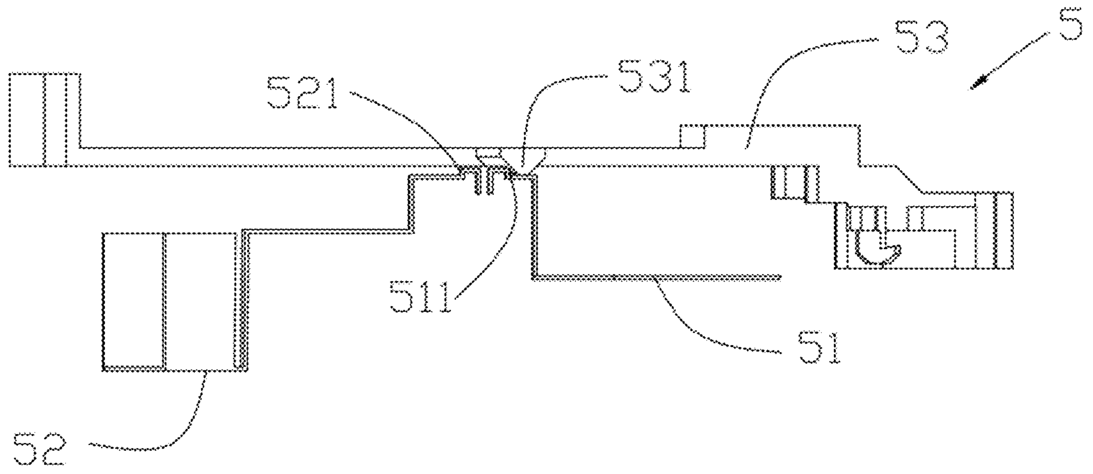
FIG. 27 is a schematic view showing the cooperative relationship between the connector and the grounding member when the process cartridge of Embodiment 2 is in a cleaning operation state.
Figure 28:
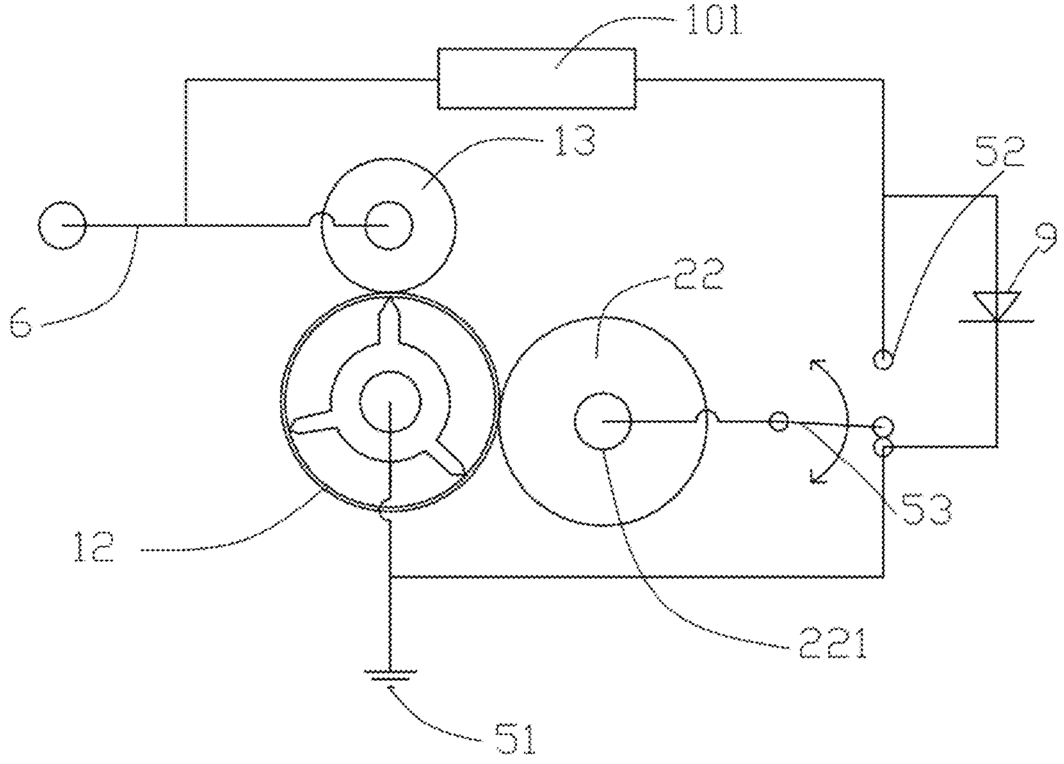
FIG. 28 is a schematic diagram of the local circuit principle when the connector is electrically connected to the grounding member in Embodiment 3.
Figure 29:
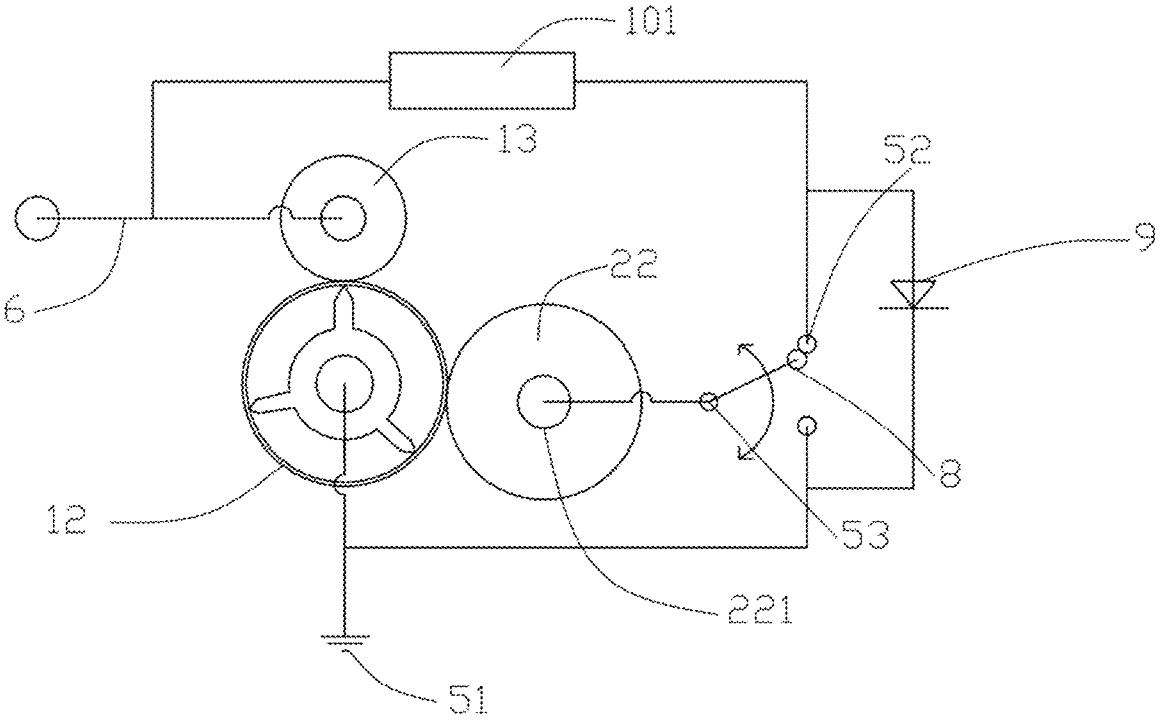
FIG. 29 is a schematic diagram of the local circuit principle when the connector is electrically connected to the power supply member in Embodiment 3.
Figure 30:
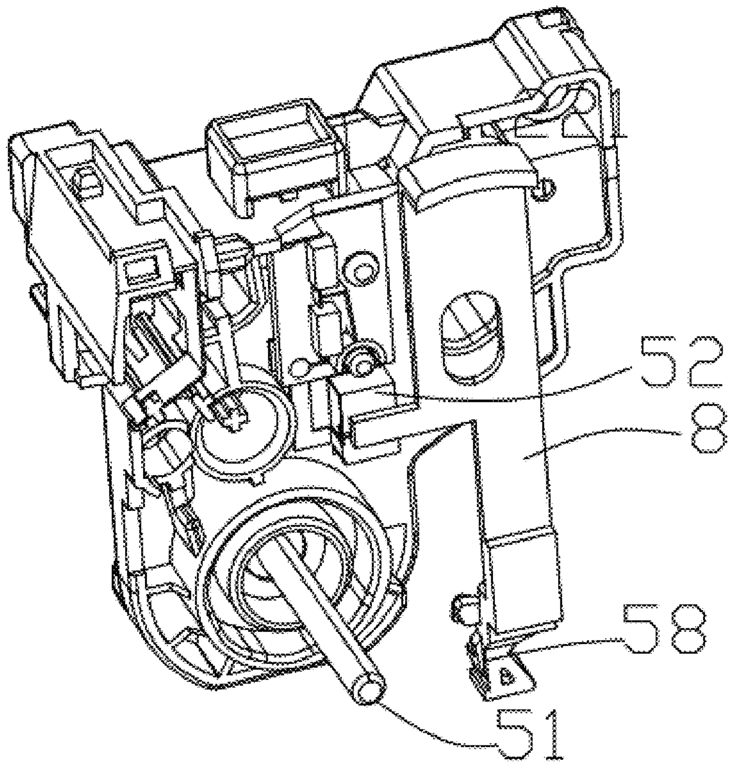
FIG. 30 is a structural schematic view of the electrical switching assembly of Embodiment 3.
Figure 31:
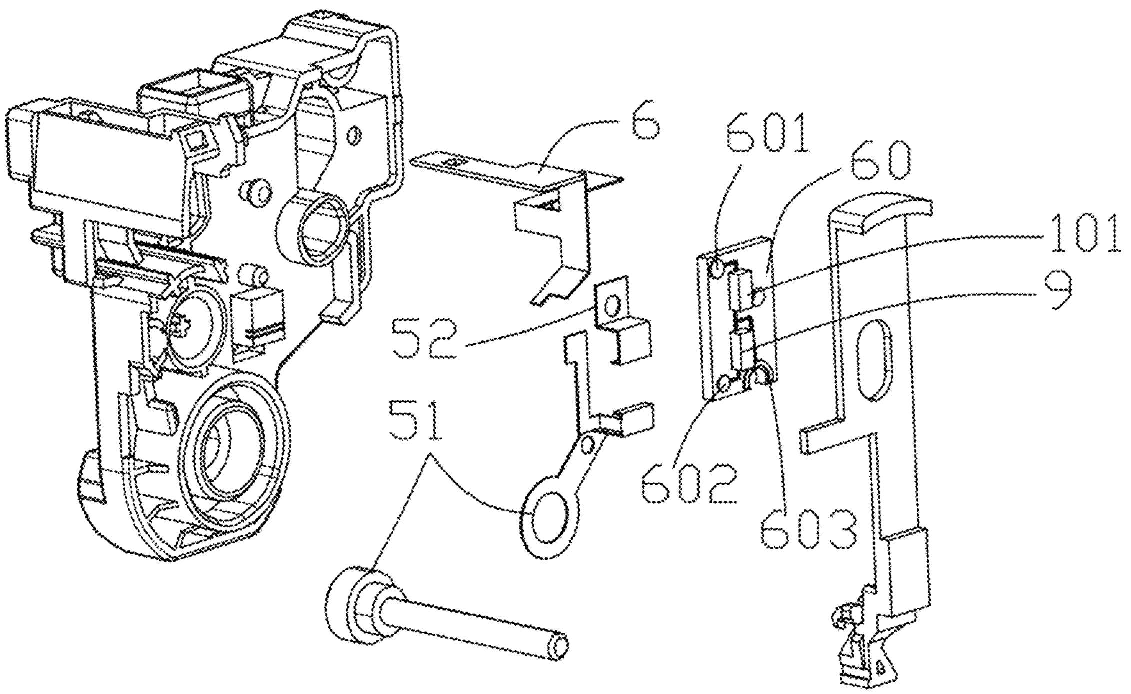
FIG. 31 is an exploded structural schematic view of the electrical switching assembly of Embodiment 3.

As shown in FIG. 25 to FIG. 27, when the process cartridge 10 needs to perform a cleaning operation, the actuating member 20 moves from the third position A to the fifth position C and pushes the force receiving end 58. The second connector piece 8 rotates to the second position. During this process, the engagement part 531 disengages from the first engaged part 521. The engagement part 531 abuts against and is held by the second engaged part 511. The second connector piece 8 connects to the grounding member 51. Subsequently, the actuating member 20 moves from the fifth position C to the third position A. The actuating member 20 no longer applies force to the force receiving end 58. Because the engagement part 531 abuts against and is held by the second engaged part 511, the electrical connection between the connector 53 and the grounding member 51 remains stable.

Because the developing roller 22 is grounded, the voltage is 0V. At this time, even if the developing roller 22 contacts the surface of the photosensitive drum 12, partial charge on the surface of the photosensitive drum 12 is conducted to the developing roller 22 through the toner on the surface of the developing roller 22. Due to the grounding, the charge is conducted away. At this time, the voltage value of the developing roller 22 is higher than the voltage value (e.g., −600V) on the photosensitive drum 12. Therefore, the negatively charged toner on the developing roller 22 cannot transfer to the surface of the photosensitive drum 12, thereby avoiding unnecessary toner deposition on the photosensitive drum 12 and avoiding contamination of the transfer belt. At the same time, there is no need to separate the photosensitive drum 12 and the developing roller 22, simplifying the complex separation mechanism.

The morphology of the aforementioned holding mechanism 50 is not limited by space. Various structural parts that can satisfy the aforementioned features may be designed, for example, using a directional elastic deformation mechanism, or a locking mechanism, both of which can satisfy the requirement of maintaining stable contact in one direction upon receiving external force.

In some implementations, the engagement part 531 is further provided with a latching part, and the first engaged part 521 and the second engaged part 511 are configured as latched parts. The engagement part 531 can switch between a latched state and a non-latched state with the first engaged part 521 and the second engaged part 511.

Embodiment 3

The process cartridge of this embodiment is a further optimization based on Embodiment 1. Its shape and structure are fundamentally the same as the shape and structure of the process cartridge 10 of Embodiment 1. Identical parts will not be described again, and the main differences will be introduced below. Components identical to those in Embodiment 1 retain the reference numerals of Embodiment 1.

Combining FIG. 28 to FIG. 31, the main difference between the process cartridge 10 of this embodiment and the process cartridge 10 of Embodiment 1 lies in that the power supply member 52 does not directly contact the main assembly of the imaging apparatus, but is electrically connected to the first conductive assembly 6.

In this embodiment, the process cartridge further includes a voltage reduction unit 101. Specifically, this voltage reduction unit 101 is a resistor connected into the circuit, which is capable of reducing the voltage applied to the power supply member 52 relative to the voltage of the first conductive assembly 6.

In some implementations, the process cartridge further includes a voltage stabilizing element 9, which is capable of keeping the voltage supplied to the developing roller 22 stable.

As shown in the figure, in some implementations, the voltage reduction unit 101 and the voltage stabilizing element 9 are integrated onto one PCB 60. The PCB 60 has a power input terminal 601, a ground terminal 602, and a power output terminal 603. The power input terminal 601 is electrically connected to the first conductive assembly 6, the ground terminal 602 is electrically connected to the grounding member 51, and the power output terminal 603 is electrically connected to the power supply member 52.

With this structure of the process cartridge 10, the power supply member 52 does not need to independently receive electrical power from the main assembly of the imaging apparatus, enabling it to be applicable to more types of imaging apparatuses and achieving universality. Furthermore, it can simplify the structure and avoid unstable contact.

When the second connector piece 8 moves to the first position, the second connector piece 8 electrically connects to the power supply member 52. At this time, the developing roller 22 is capable of receiving electrical power with a voltage (e.g., −300V voltage) lower than that of the charging roller 13.

When the second connector piece 8 moves to the second position, the second connector piece 8 electrically connects to the grounding member 51.

The technical solution of this embodiment can be applied to Embodiment 1, and can also be applied to Embodiment 2.

Embodiment 4

The process cartridge of this embodiment is a further optimization based on the above embodiments. Its shape and structure are fundamentally the same as the shape and structure of the process cartridges of the above embodiments. Identical parts will not be described again, and the main differences will be introduced below. Components identical to those in the above embodiments retain the reference numerals of the above embodiments.

Figure 32:
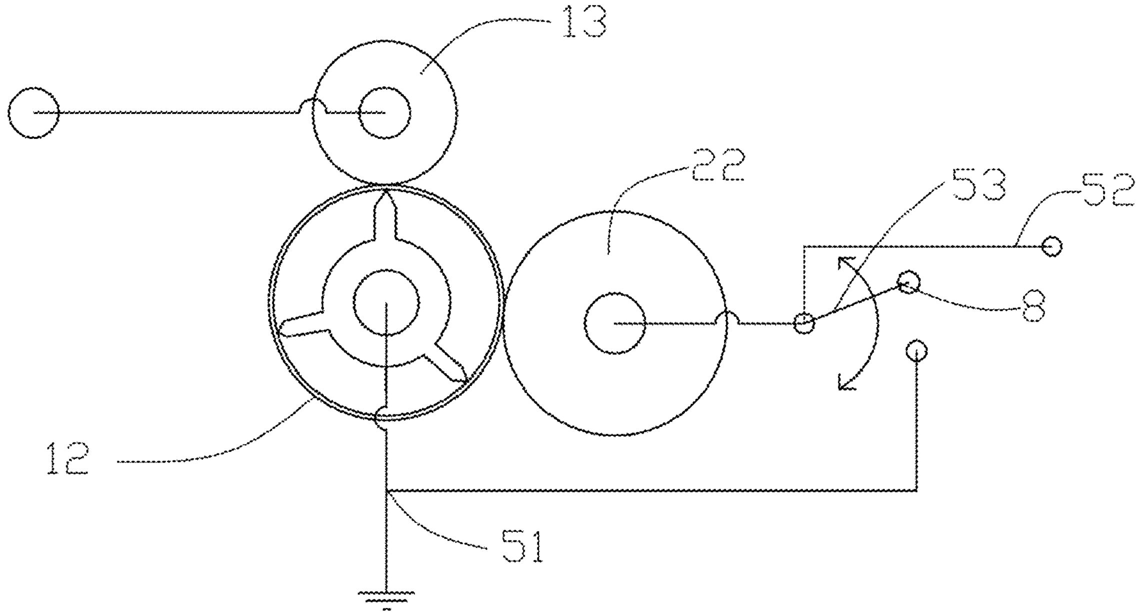
FIG. 32 is a schematic diagram of the local circuit principle when the connector is electrically disconnected from the grounding member in Embodiment 4.
Figure 33:
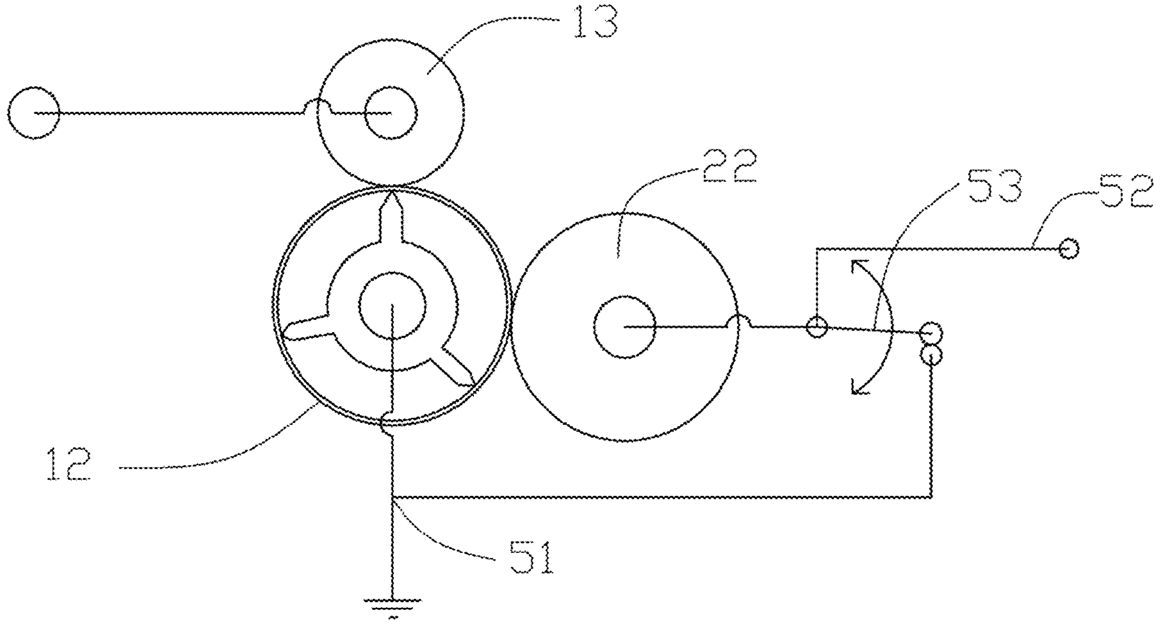
FIG. 33 is a schematic diagram of the local circuit principle when the connector is electrically connected to the grounding member in Embodiment 4.

As shown in FIG. 32 and FIG. 33, the connector 53 of this embodiment always maintains electrical connection with the power supply member 52. The power supply member 52 is electrically connected to the imaging apparatus. That is, the developing roller 22 always maintains electrical connection with the power supply member 52.

Specifically, at least a portion of the connector 53 (this portion may be the second connector piece 8) is movable between a first position electrically connected to the power supply member 52 and a second position electrically connected to the voltage regulating member. At the first position, the connector 53 is electrically connected to the power supply member 52. At the second position, the connector 53 is electrically connected simultaneously to the power supply member 52 and the voltage regulating member 51. Specifically, the voltage regulating member is the grounding member 51.

As shown in FIG. 32, when the connector 53/second connector piece 8 is disconnected from the grounding member 51 (the connector/second connector piece is at the first position), the connector 53 is electrically connected to the power supply member 52. The developing roller 22 is supplied with a first voltage (e.g., −200V). At this time, the developing roller 22 contacts the photosensitive drum 12, and the toner on the developing roller 22 can transfer to the exposed area of the photosensitive drum 12 under the action of the electric field force.

As shown in FIG. 33, when the connector 53/second connector piece 8 is electrically connected to the grounding member 51 (the connector/second connector piece is at the second position), the connector 53/second connector piece 8 is always electrically connected to the power supply member 52. The developing roller 22 is grounded. At this time, the voltage applied to the developing roller 22 is a second voltage (e.g., 0V or −50V). The absolute value of the second voltage (e.g., 0V or −50V) is less than the absolute value of the first voltage (e.g., −200V). At this time, the electric field force received by the toner points towards the developing roller 22, or the electric field force points towards the photosensitive drum 12 but is insufficient to cause the toner to move from the surface of the developing roller 22 to the photosensitive drum 12.

The process cartridge having the above structure solves the problem where, during non-imaging work (e.g., cleaning operation), the developing roller 22 and the photosensitive drum 12 are not separated, leading to toner transfer to the surface of the photosensitive drum 12, causing contamination of the photosensitive drum 12, transfer belt, etc., by toner. Furthermore, since the connector 53/second connector piece 8 is always electrically connected to the power supply member 52, such an embodiment ensures that there is no disconnection time during the voltage switching process of the developing roller 12, avoiding instantaneous changes in the electric field caused by the connector member 53 appearing disconnected for a short interval during the switching process between the two positions, which could cause toner on the surface of the developing roller 22 to be transferred to the surface of the photosensitive drum 12. Secondly, it can also avoid wear and tear between the connector 53/second connector piece 8 and the power supply member 52 caused by frequent disconnection and connection operations, while also improving the stability of the electrical connection between the two.

Embodiment 5

The process cartridge of this embodiment is a further optimization based on the above Embodiments 1-4. Its shape and structure are fundamentally the same as the shape and structure of the process cartridges of the above embodiments. Identical parts will not be described again, and the main differences will be introduced below. Components identical to those in the above embodiments retain the reference numerals of the above embodiments.

Figure 34:
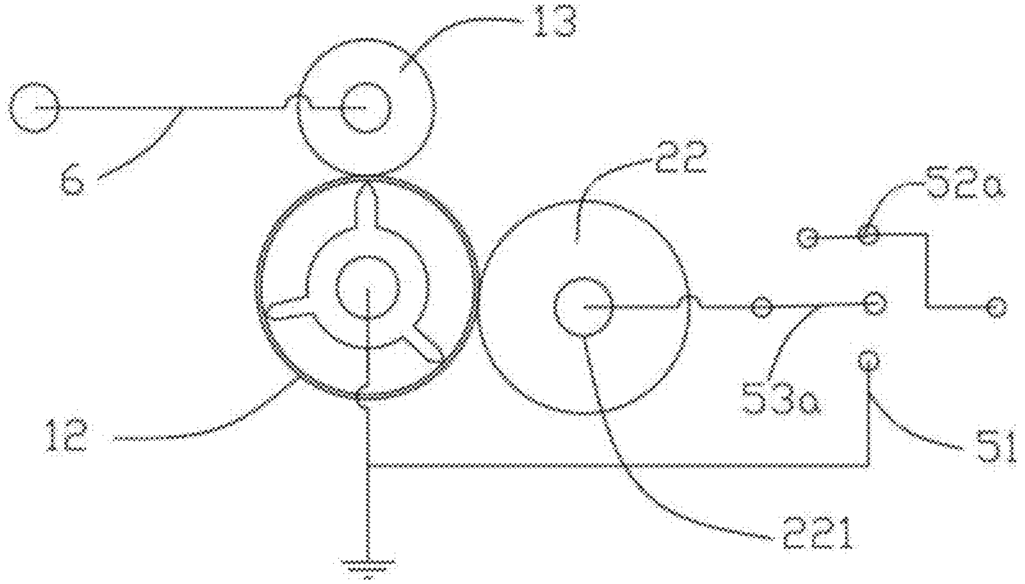
FIG. 34 is a schematic diagram of the local circuit principle when the connector is not electrically connected to the power supply member in Embodiment 5.
Figure 35:
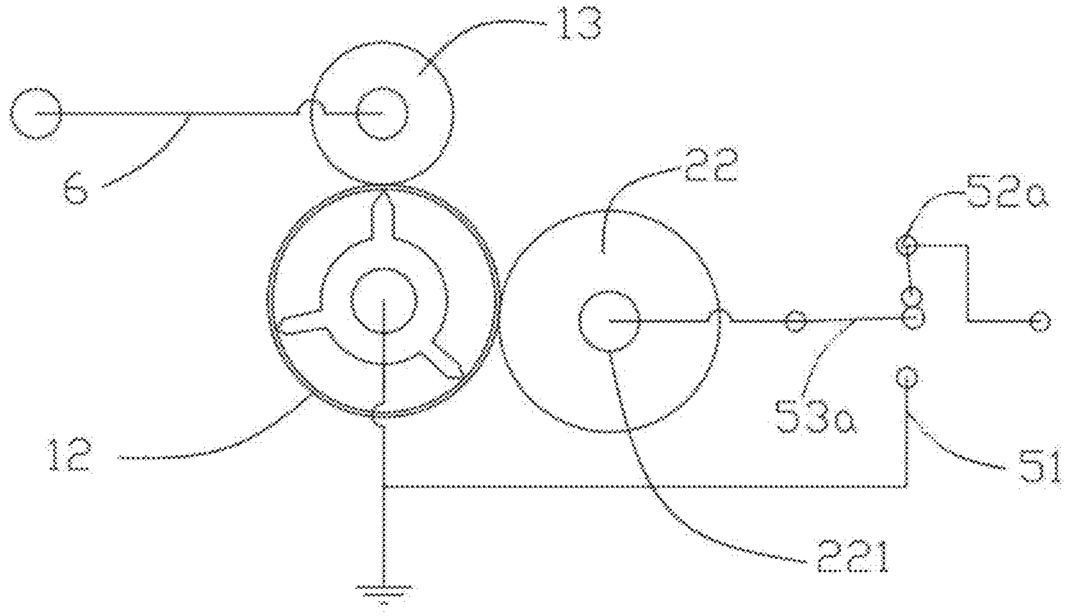
FIG. 35 is a schematic diagram of the local circuit principle when the connector is electrically connected to the power supply member in Embodiment 5.
Figure 36:
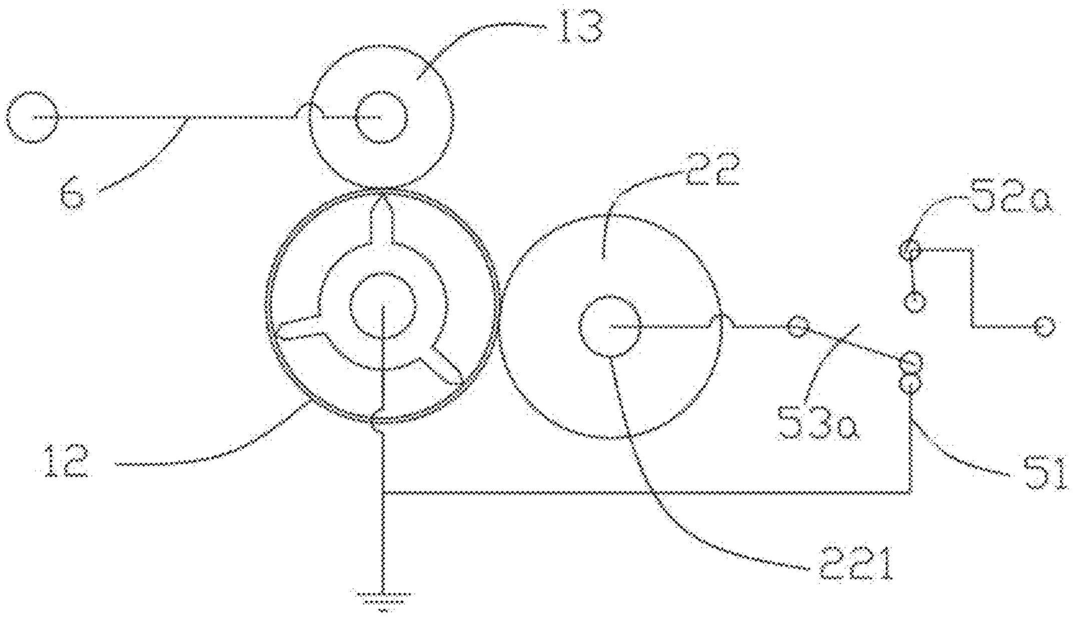
FIG. 36 is a schematic diagram of the local circuit principle when the connector is electrically connected to the grounding member in Embodiment 5.

As shown in FIG. 34 to FIG. 36, what differs from the above embodiments is that at least a portion of the power supply member 52*a* of this embodiment is configured to be movable relative to the connector 53*a*. Specifically, at least a portion of the power supply member 52*a* is movable between a position where it is electrically connected to the connector 53*a* and a position where it is not connected to the connector 53*a*. Before the imaging operation, the power supply member 52*a* and the connector 53*a* can be in a non-electrically connected state (as shown in FIG. 34). During the imaging operation, the power supply member 52*a* is electrically connected to the connector 53*a* (as shown in FIG. 35) to be able to supply power to the developing roller 22. During non-imaging operation (e.g., during cleaning operation), the power supply member 52*a* disconnects the electrical connection with the connector 53*a*, and the power supply member 52*a* stops transmitting power to the developing roller 22. The connector 53*a* electrically connects to the grounding member 51 (as shown in FIG. 36).

In some implementations, the power supply member 52*a* and the connector 53*a* always maintain electrical connection.

Embodiment 6

The process cartridge of this embodiment is a further optimization based on the above Embodiments 1-5. Its shape and structure are fundamentally the same as the shape and structure of the process cartridges of the above embodiments. Identical parts will not be described again, and the main differences will be introduced below. Components identical to those in the above embodiments retain the reference numerals of the above embodiments.

Figure 37:
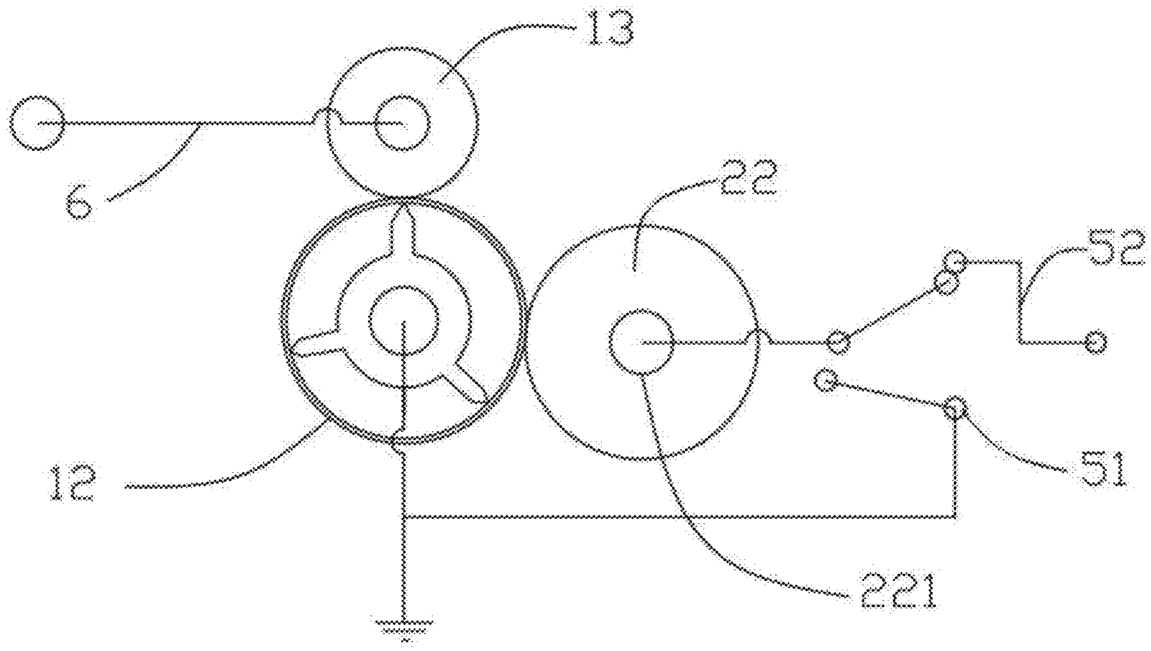
FIG. 37 is a schematic diagram of the local circuit principle when the connector is not electrically connected to the grounding member in Embodiment 6.
Figure 38:
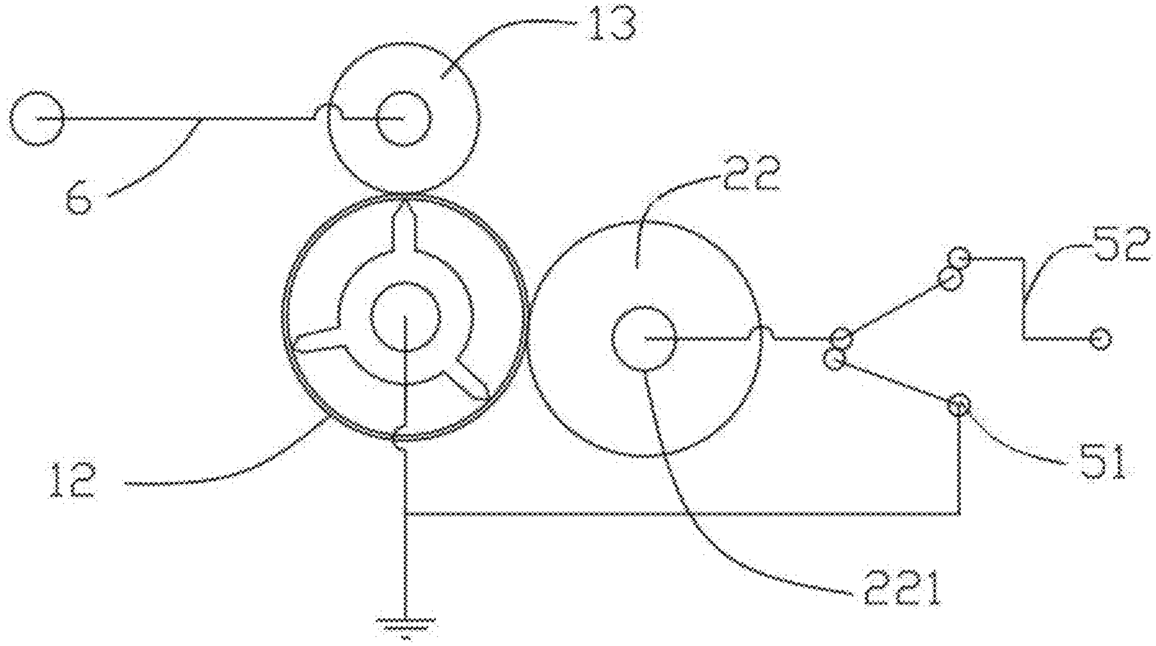
FIG. 38 is a schematic diagram of the local circuit principle when the connector is electrically connected to the grounding member in Embodiment 6.

As shown in FIG. 37 and FIG. 38, what differs from the above embodiments is that at least a portion of the grounding member 51 of this embodiment is configured to be movable, causing the developing roller 22 to be grounded or not grounded. Specifically, at least a portion of the grounding member 51 is movable between a position where it is electrically connected to the connector 53 and a position where it is not electrically connected to the connector 53. During imaging operation, the grounding member 51 is not electrically connected to the connector 53 (as shown in FIG. 37). At this time, the developing roller 22 is not grounded. During non-imaging operation (e.g., during cleaning operation), the grounding member 51 is electrically connected to the connector 53 (as shown in FIG. 38), and the developing roller 22 is grounded.

In some implementations, at least a portion of the grounding member 51 and at least a portion of the power supply member 52 are configured to be movable relative to the connector.

In some implementations, at least a portion of the grounding member 51, at least a portion of the power supply member 52, and at least a portion of the connector 53 are configured to be movable.

Figure 39:
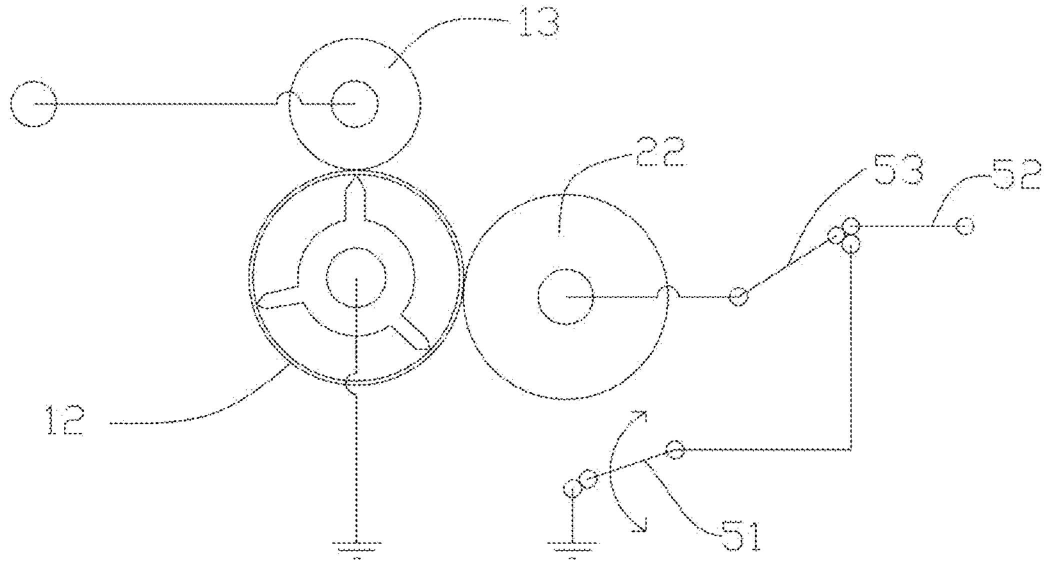
FIG. 39 is a schematic diagram of the local circuit principle in a variation of Embodiment 6 when the grounding member is electrically connected to the grounding terminal of the imaging apparatus.
Figure 40:
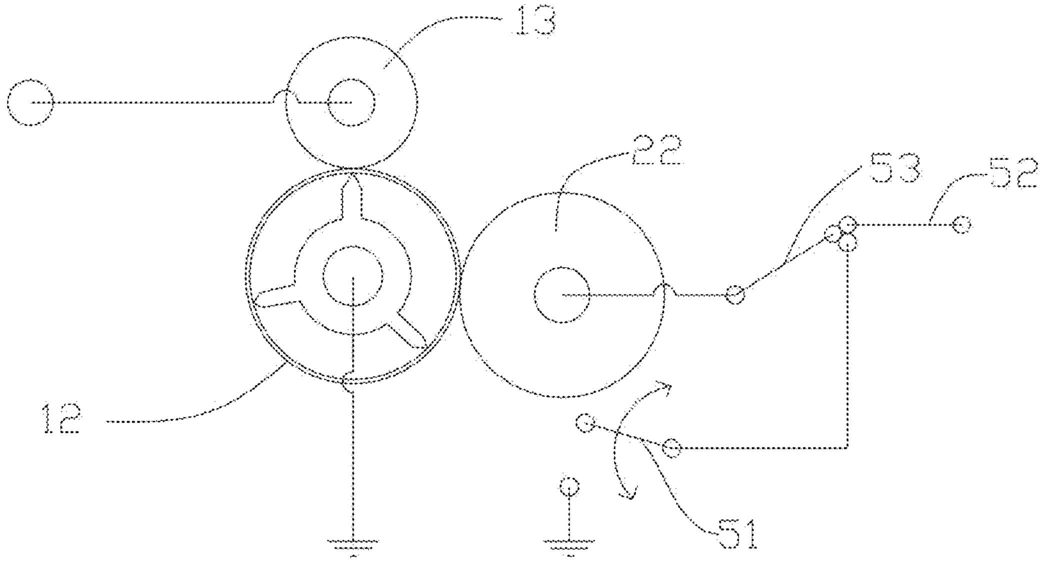
FIG. 40 is a schematic diagram of the local circuit principle in a variation of Embodiment 6 when the grounding member is not electrically connected to t terminal of the imaging apparatus.

In a variation of this embodiment, as shown in FIG. 39 and FIG. 40, at least a portion of the grounding member 51 is configured to be movable. Specifically, the grounding member 51 is movable relative to the imaging apparatus, and the grounding member 51 and the imaging apparatus are switchable between an electrically connected state and a non-electrically connected state.

In some embodiments, the processing cartridge 10 further comprises a developing blade 24 and a storage chip 26. The developing blade 24 is fixedly supported on the developing unit frame 21, and the developing blade 24 is provided with a regulating portion 241 that contacts the developing roller 22. The regulating portion 241 is used to regulate the thickness of toner on the surface of the developing roller 22. Specifically, the regulating portion 241 of the developing blade 24 contacts the first main body portion 222 and forms an electrical connection therewith. It will be understood that the connector 53 and the developing roller 22 can be electrically connected either directly or indirectly, for example, the connector 53 is indirectly electrically connected to the developing roller 22 through at least one of the developing blade 24 and the toner supply roller 23.

The storage chip 26 is used to store information about the processing cartridge 10, such as model number, production date, remaining lifespan, etc. The storage chip 26 includes a ground contact. When the processing cartridge 10 is installed into the imaging apparatus, the storage chip 26 forms an electrical connection with the apparatus. At this time, the ground contact is grounded through the apparatus. It will be understood that the ground contact can be regarded as the grounding member 51, and the developing roller 22 is grounded by being electrically connected to the storage chip 26.

In some embodiments, the grounding member 51 is grounded by being electrically connected to the door cover, side wall, or transfer belt of the imaging apparatus.

Figure 41:
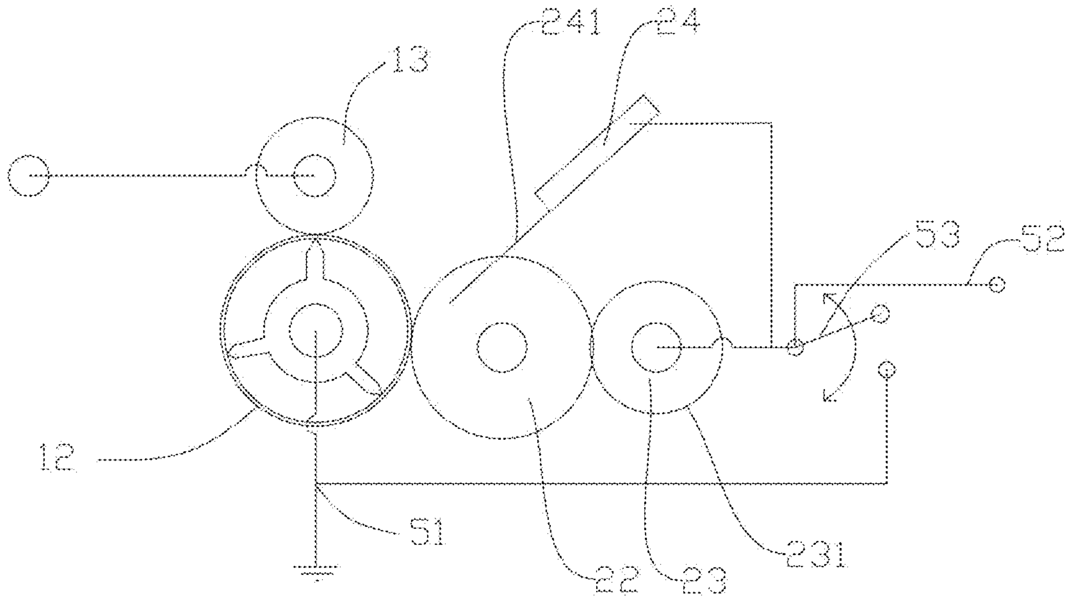
FIG. 41 is a schematic diagram of the local circuit principle in another variation of Embodiment 6 when the connector is not electrically connected to the grounding member.
Figure 42:
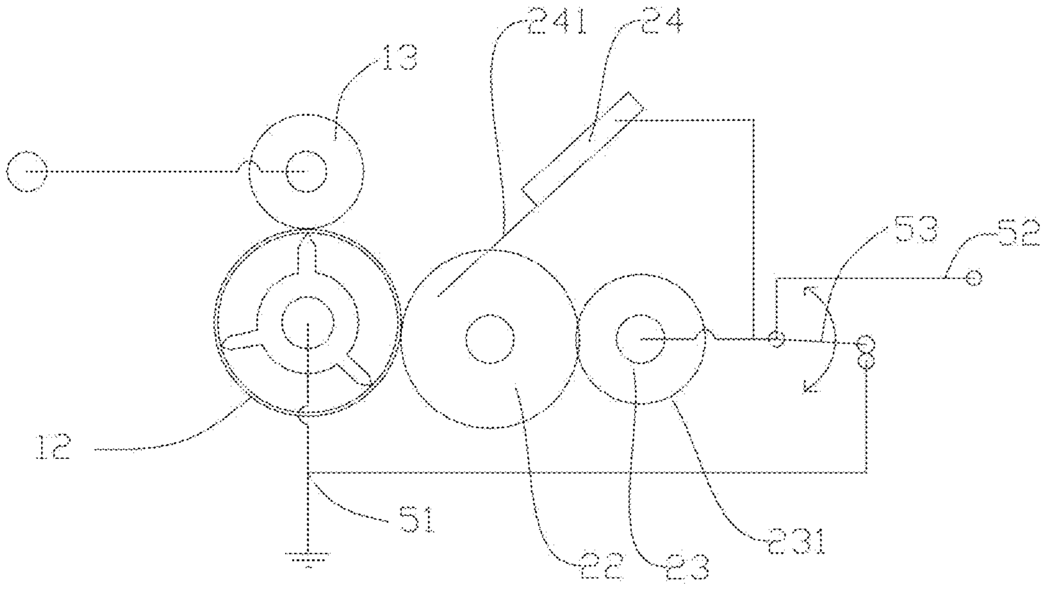
FIG. 42 is a schematic diagram of the local circuit principle in another variation of Embodiment 6 when the connector is electrically connected to the grounding member.

In another variation of this embodiment, as shown in FIG. 41 and FIG. 42, the connector 53 forms an electrical connection with the developing roller 22 through the developing blade 24. Specifically, the connector 53 is electrically connected to the developing blade 24, and the developing blade 24 contacts the first main body portion 222 of the developing roller 22 and forms an electrical connection therewith. At least a portion of the connector 53 is switchable between a state of being electrically connected to the grounding member 51 and a state of not being electrically connected. When the at least a portion of the connector 53 is at a first position, the connector 53 is disconnected from the grounding member 51, and the developing roller 22 is in a non-grounded state. When the at least a portion of the connector 53 is at a second position, the connector 53 is electrically connected to the grounding member 51. At this time, the grounding member 51, the connector 53, the developing blade 24, and the first main body portion 222 are sequentially electrically connected, causing the developing roller 22 to be in a grounded state.

In some embodiments, the connector 53 is electrically connected to the developing roller 22 through the toner supply roller 23. Specifically, the toner supply roller 23 contacts the developing roller 22 and forms an electrical connection therewith. When the developing roller 22 is in the grounded state, the grounding member 51, the connector 53, the toner supply roller 23, and the first main body portion 222 are sequentially electrically connected.

In some embodiments, the connector 53 is electrically connected simultaneously to both the toner supply roller 23 and the developing blade 24. The connector 53 is electrically connected to the developing roller 22 through the toner supply roller 23 and the developing blade 24.

In some embodiments, the developing blade 24 and/or the toner supply roller 23 can be regarded as the connector 53. The grounding member 51 is directly electrically connected to the developing blade 24 and/or the toner supply roller 23, and the grounding member 51 is switchable between a state of being electrically connected to the developing blade 24 and/or the toner supply roller 23 and a state of not being electrically connected to the developing blade 24 and/or the toner supply roller 23. The power supply member 52 is electrically connected to the developing roller 22 through the developing blade 24 and/or the toner supply roller 23. Specifically, the power supply member 52 is electrically connected to the developing blade 24 and/or the toner supply roller 23, and the developing blade 24 and/or the toner supply roller 23 is electrically connected to the developing roller 22.

In some embodiments, the at least a portion of the connector 53 is switchable between the first position and the second position by receiving driving force from the first driving unit 15 or the second driving unit 25.

In some embodiments, at least a portion of the grounding member 51 is movable by receiving driving force from the first driving unit 15 or the second driving unit 25. Specifically, when the grounding member 51 receives the driving force from the first driving unit 15 or the second driving unit 25, the at least a portion of the grounding member 51 is capable of switching between a position electrically connected to the connector 53 and/or the imaging apparatus and a position not electrically connected thereto, causing the developing roller to be grounded or not grounded.

It will be understood that this embodiment is not only used to suppress the transfer of toner from the developing roller 22 to the photosensitive drum 12, but can also be used for electrical detection by changing the voltage of the developing roller 22, to detect the remaining toner amount in the processing cartridge 10 or whether it is a new cartridge (first use).

Finally, it should be noted that the above embodiments are merely used to illustrate the technical solutions of the present application, and not to limit it. To facilitate distinguishing different components, the present application introduces terms such as "first," "second," etc. The terms "first," "second," etc., should not be understood as limitations on their quantity. According to the description in the specification, the components described as "first," "second," etc., may be one, or may include multiple.

Although the present application has been described in detail with reference to the foregoing embodiments, those of ordinary skill in the art should understand that they can still modify the technical solutions described in the foregoing embodiments, or equivalently replace some or all of the technical features therein; and these modifications or replacements do not cause the essence of the corresponding technical solutions to depart from the scope of the technical solutions of the embodiments of the present application.

What is claimed is:

1. A process cartridge installable into a main assembly of an imaging apparatus, comprising:

a developing unit frame;

a developing roller rotatably supported by the developing unit frame;

a power supply member capable of being electrically connected to the developing roller and capable of contacting an electrical power component within the main assembly to receive electrical power; and a grounding member capable of switching between a state of being electrically connected to the developing roller and a state of not being electrically connected to the developing roller.

2. The process cartridge according to claim 1, wherein the power supply member is capable of supplying power to the developing roller, the developing roller has a first voltage value when the developing roller is not electrically connected to the grounding member; and the developing roller has a second voltage value when the developing roller is electrically connected to the grounding member; an absolute value of the first voltage value is greater than an absolute value of the second voltage value.

3. The process cartridge according to claim 1, further comprising a connector capable of being electrically connected to the developing roller and the power supply member, wherein the connector is capable of switching between a state of being electrically connected to the grounding member and a state of not being electrically connected to the grounding member.

4. The process cartridge according to claim 3, wherein the connector is capable of switching between an electrically connected state and a non-electrically connected state with the power supply member.

5. The process cartridge according to claim 3, wherein at least a portion of the connector is movable between a first position electrically connected to the power supply member and a second position electrically connected to the grounding member.

6. The process cartridge according to claim 5, wherein when the at least a portion of the connector is at the first position, the connector is electrically connected to the power supply member; and when the at least a portion of the connector is at the second position, the connector is electrically connected simultaneously to the power supply member and the grounding member.

7. The process cartridge according to claim 5, further comprising a force receiving end, wherein the force receiving end is capable of causing the at least a portion of the connector to move between the first position and the second position.

8. The process cartridge according to claim 3, wherein at least a portion of the grounding member and/or at least a portion of the power supply member is movable between a position electrically connected to the connector and a position not electrically connected to the connector.

9. The process cartridge according to claim 3, further comprising a photosensitive unit frame connected to the developing unit frame, and a first cover member and a second cover member respectively disposed at two ends of the photosensitive unit frame in a length direction thereof, wherein the grounding member comprises a first grounding piece and a second grounding piece, one end of the first grounding piece passes through a hole in the second cover member and inserts into a photosensitive drum, one end of the second grounding piece is electrically connected to the first grounding piece, and another end of the second grounding piece is configured to be electrically connected to or disconnected from the connector.

10. The process cartridge according to claim 3, wherein the connector comprises a first connector piece and a second connector piece, the first connector piece is installed at one end of the developing unit frame, the first connector piece is electrically connected to the developing roller, the second connector piece is electrically connected to the first connector piece, the second connector piece is movable between a first position and a second position; when the second connector piece is at the first position, the second connector piece is electrically connected to the power supply member; when the second connector piece is at the second position, the second connector piece is connected to the grounding member.

11. The process cartridge according to claim 10, wherein the first connector piece is configured to rotatably support a developing roller shaft of the developing roller and form an electrical connection therewith.

12. The process cartridge according to claim 10, wherein the second connector piece comprises a conductive portion and a non-conductive portion, the conductive portion is configured for electrical connection to the developing roller and for electrical connection to the power supply member or the grounding member, the non-conductive portion is provided with a force receiving end.

13. The process cartridge according to claim 3, wherein the connector comprises a conductive portion and a non-conductive portion, the conductive portion is configured for conduction, the non-conductive portion is configured for supporting the conductive portion or mounting the conductive portion.

14. The process cartridge according to claim 3, further comprising a holding mechanism, wherein at least a portion of the connector is movable between a first position electrically connected to the power supply member and a second position electrically connected to the grounding member; when the at least a portion of the connector moves to the first position, the holding mechanism is capable of causing the connector to maintain electrical connection with the power supply member; when the at least a portion of the connector moves to the second position, the holding mechanism is capable of causing the connector to maintain electrical connection with the grounding member.

15. The process cartridge according to claim 1, further comprising a force receiving end, wherein the force receiving end is movable between a protruding position and a retracted position, the force receiving end in the retracted position is closer to the developing unit frame compared to the protruding position.

16. The process cartridge according to claim 1, wherein the developing roller comprises a developing roller shaft and a first main body portion supported on the developing roller shaft; the process cartridge further comprises a connector having a first connection end and a second connection end, the first connection end is electrically connected to the developing roller shaft, the second connection end is movable between a first position contacting the power supply member and a second position contacting the grounding member.

17. The process cartridge according to claim 1, wherein the grounding member is configured for grounding.

18. A process cartridge installable into a main assembly of an imaging apparatus, comprising:

a developing unit frame;

a developing roller rotatably supported by the developing unit frame;

a power supply member capable of being electrically connected to the developing roller and capable of contacting an electrical power component within the main assembly to receive electrical power; and a grounding member capable of being electrically connected to the developing roller, wherein at least a portion of the grounding member is configured to be movable to cause the developing roller to be grounded or not grounded.

19. The process cartridge according to claim 18, further comprising a connector, wherein the connector is capable of being electrically connected to the developing roller and the power supply member, and at least a portion of the grounding member and at least a portion of the power supply member are configured to be movable relative to the connector.

20. The process cartridge according to claim 18, wherein the power supply member is capable of supplying power to the developing roller; the developing roller has a first voltage value when the developing roller is not electrically connected to the grounding member; and the developing roller has a second voltage value when the developing roller is electrically connected to the grounding member; an absolute value of the first voltage value is greater than an absolute value of the second voltage value.

* * * * *